(12) United States Patent
Kang et al.

(10) Patent No.: US 10,425,523 B2
(45) Date of Patent: Sep. 24, 2019

(54) METHOD FOR CONTROLLING MOBILE TERMINAL, AND MOBILE TERMINAL

(71) Applicant: SAMSUNG ELECTRONICS CO., LTD., Suwon-si (KR)

(72) Inventors: Fengxia Kang, Jiangsu (CN); Shengfeng Zhou, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/570,543

(22) PCT Filed: May 23, 2016

(86) PCT No.: PCT/KR2016/005451
§ 371 (c)(1),
(2) Date: Oct. 30, 2017

(87) PCT Pub. No.: WO2016/190640
PCT Pub. Date: Dec. 1, 2016

(65) Prior Publication Data
US 2018/0176363 A1 Jun. 21, 2018

(30) Foreign Application Priority Data

May 22, 2015 (CN) ........................ 2015 1 0267461
Mar. 9, 2016 (CN) ........................ 2016 1 0137079
May 23, 2016 (KR) ........................ 10-2016-0062999

(51) Int. Cl.
*G01S 5/02* (2010.01)
*H04M 1/725* (2006.01)
(Continued)

(52) U.S. Cl.
CPC ........ *H04M 1/72563* (2013.01); *H04L 51/04* (2013.01); *H04L 51/043* (2013.01);
(Continued)

(58) Field of Classification Search
CPC ..... H04W 64/006; H04W 4/06; H04W 88/18; H04N 5/23219; H04N 5/2353; H04B 7/15507; G06Q 30/0251
(Continued)

(56) References Cited

U.S. PATENT DOCUMENTS 7,039,676 B1  5/2006  Day et al.
7,512,407 B2  3/2009  Wu et al.
(Continued)

FOREIGN PATENT DOCUMENTS

CN        1812380 A    8/2006
CN        1941707 A    4/2007
(Continued)

OTHER PUBLICATIONS

International Search Report and Written Opinion (PCT/ISA/210 & PCT/ISA/237) dated Jul. 27, 2016 issued by the International Searching Authority in counterpart International Application No. PCT/KR2016/005451.
(Continued)

*Primary Examiner* — Phuoc H Doan
(74) *Attorney, Agent, or Firm* — Sughrue Mion, PLLC

(57) ABSTRACT

The present disclosure discloses a method of controlling a mobile terminal, and a mobile terminal. The method of controlling a mobile terminal includes obtaining a motion status of a user of the mobile terminal, and performing a function of the mobile terminal corresponding to a predetermined event, based on the obtained motion status.

13 Claims, 20 Drawing Sheets

(51) Int. Cl.
*H04M 19/04* (2006.01)
*H04L 12/58* (2006.01)
*H04L 29/08* (2006.01)
*H04W 4/02* (2018.01)
*H04W 4/12* (2009.01)

(52) U.S. Cl.
CPC ........ *H04L 67/24* (2013.01); *H04M 1/72569* (2013.01); *H04M 19/04* (2013.01); *H04W 4/027* (2013.01); *H04L 67/18* (2013.01); *H04M 2250/12* (2013.01); *H04W 4/12* (2013.01)

(58) Field of Classification Search
USPC ............ 455/418, 456.1, 437, 404.1; 342/457
See application file for complete search history.

(56) References Cited

U.S. PATENT DOCUMENTS

| | | | |
|---|---|---|---|
| 8,213,914 | B2 | 7/2012 | Kim et al. |
| 9,032,337 | B2 | 5/2015 | Oh et al. |
| 2007/0260730 | A1 | 11/2007 | Gadwale |
| 2011/0106530 | A1 | 5/2011 | Kim |
| 2013/0104089 | A1 | 4/2013 | Rieffel et al. |
| 2013/0104090 | A1 | 4/2013 | Yu et al. |
| 2013/0203393 | A1 | 8/2013 | Bugalia et al. |
| 2013/0237204 | A1* | 9/2013 | Buck ................ H04M 1/72569 455/418 |
| 2015/0112796 | A1* | 4/2015 | Greenzeiger ...... G06Q 30/0251 705/14.49 |

FOREIGN PATENT DOCUMENTS

| | | |
|---|---|---|
| CN | 101150542 A | 3/2008 |
| CN | 101179533 A | 5/2008 |
| CN | 101754462 A | 6/2010 |
| CN | 102655541 A | 9/2012 |
| CN | 103179535 A | 6/2013 |
| CN | 10350047 A | 1/2014 |
| CN | 103476985 A | 4/2014 |
| CN | 103747140 A | 4/2014 |
| CN | 103763675 A | 4/2014 |
| CN | 103873342 A | 6/2014 |
| EP | 2 608 501 A1 | 6/2013 |
| JP | 2005-115557 A | 4/2005 |
| JP | 2013-32932 A | 2/2013 |
| JP | 2013-89238 A | 5/2013 |
| KR | 10-2010-0021859 A | 2/2010 |
| KR | 10-2010-0073743 A | 7/2010 |
| KR | 10-2011-0046909 A | 5/2011 |
| KR | 10-1117424 B1 | 2/2012 |
| KR | 10-2014-0073232 A | 6/2014 |
| WO | 2009/023701 A1 | 2/2009 |
| WO | 2009/023701 A2 | 2/2009 |
| WO | 2013/029258 A1 | 3/2013 |

OTHER PUBLICATIONS

Communication dated May 4, 2018, issued by the European Patent Office counterpart European Patent Application No. 16800279.8.
Communication dated Jul. 25, 2018, issued by the State Intellectual Property Office of P.R. China in counterpart Chinese Application No. 201610137079.1.
Communication dated Aug. 1, 2018, issued by the European Patent Office in counterpart European Application No. 16800279.8.

* cited by examiner

METHOD FOR CONTROLLING MOBILE TERMINAL, AND MOBILE TERMINAL

TECHNICAL FIELD

The present disclosure relates to a method of controlling a mobile terminal, and a mobile terminal.

BACKGROUND ART

To more effectively utilize functions of a mobile terminal, information about a status of a user of the mobile terminal may be reflected. However, if the user directly selects and sets the information about the status of the user, an actual status of the user cannot be accurately reflected.

DETAILED DESCRIPTION OF THE INVENTION

Technical Problem

The present disclosure provides a method of controlling a mobile terminal, and a mobile terminal, whereby functions of the mobile terminal are more effectively utilized by using information about an actual motion status of a user of the mobile terminal.

Technical Solution

According to a first aspect of the present invention, there is provided a method of controlling a mobile terminal, the method including obtaining a motion status of a user of the mobile terminal; and performing a function of the mobile terminal corresponding to a predetermined event, based on the obtained motion status.

The obtaining of the motion status may include periodically receiving output data from an inertia sensor of the mobile terminal; reading a feature value from the received output data; and determining a motion status corresponding to the read feature value from a table of mapping relationships between motion statuses and feature values.

The obtaining of the motion status may include obtaining, by a global positioning system (GPS), starting location information and ending location information corresponding to a predetermined time interval; calculating a movement velocity corresponding to the predetermined time interval, based on the starting location information and the ending location information; and determining a motion status corresponding to the calculated movement velocity from a table of mapping relationships between motion statuses and movement velocities.

The performing of the function of the mobile terminal may include updating a motion status of an instant messaging user displayed on an instant messaging interface in response to execution of an instant message application, based on the obtained motion status.

The performing of the function of the mobile terminal may include updating a motion status of an opposite party displayed on a call interface in response to execution of a call application, based on the obtained motion status.

The performing of the function of the mobile terminal may include updating a motion status of a contact displayed on an address list in response to execution of an address list application, based on the obtained motion status.

The performing of the function of the mobile terminal may include displaying, in real time, a motion status of a contact in an address list and a time period required by the contact from a current location to a destination on a user interface in response to execution of a real-time timing function for the contact, based on the obtained motion status.

The performing of the function of the mobile terminal may include automatically switching a device mode in response to execution of the mobile terminal, based on the obtained motion status.

The performing of the function of the mobile terminal may include adjusting a ringtone or a call volume of the mobile terminal when receiving a call, based on the obtained motion status.

The performing of the function of the mobile terminal may include, when an incoming call or a received short message is not answered for a long time, sending a status reply including the obtained motion status to an opposite party of the incoming call or the received short message, based on the obtained motion status.

According to a second aspect of the present invention, there is provided a mobile terminal including a memory configured to store computer executable instructions; and at least one processor configured to obtain a motion state of a user of the mobile terminal and perform a function of the mobile terminal corresponding to a predetermined event, based on the obtained motion state, by executing the computer executable instructions.

According to a third aspect of the present invention, there is provided a method for communication of a mobile terminal, the method including selecting a setting item for resetting communication setting; detecting a motion status of the mobile terminal in real time; obtaining a current motion status of the mobile terminal; and resetting the selected setting item according to the obtained motion status.

According to a fourth aspect of the present invention, there is provided a mobile terminal including a system setting module configured to select a setting item for resetting communication setting; a motion status determining module configured to detect a motion status of the mobile terminal in real time, obtain a current motion status of the mobile terminal, and send the obtained motion status to the communication resetting module; and a communication resetting module configured to reset the selected setting item according to the obtained motion status.

As shown in the above technical solutions of the present disclosure, the motion status of the mobile terminal may be detected in real time, and the current motion status of the mobile terminal may be obtained. The selected setting item may be reset according to the obtained motion status. Accordingly, the communication setting may be performed automatically according to an actual motion status of the mobile terminal, thereby making the communication setting more accurate and intelligent.

BEST MODE

A method of controlling a mobile terminal includes obtaining a motion status of a user of the mobile terminal; and performing a function of the mobile terminal corresponding to a predetermined event, based on the obtained motion status.

Mode of the Invention

Exemplary embodiments of the present disclosure will now be described more fully with reference to the accompanying drawings. The various embodiments below are only to specify the inventive concept and are not to restrict or limit the right scope of the inventive concept. It is analyzed that those which could be readily inferred by one of ordinary skill in the art to which the inventive concept belongs from the detailed description and the various embodiments belong to the right scope of the inventive concept.

Terms "configured" or "include" used herein should not be construed as necessary including all of several components or several steps written in the specification, but as not including some of the components or steps or as further including additional components or steps.

While such terms as "first," "second," etc., may be used to describe various components, such components must not be limited to the above terms. The above terms are used only to distinguish one component from another.

The below embodiments relate to a mobile terminal and a method of controlling a mobile terminal, and a detailed description of matters well known to one of ordinary skill in the art to which the below embodiments pertain will be omitted.

The present disclosure is described in detail with reference to the attached drawings and the embodiments.

Figure 1:
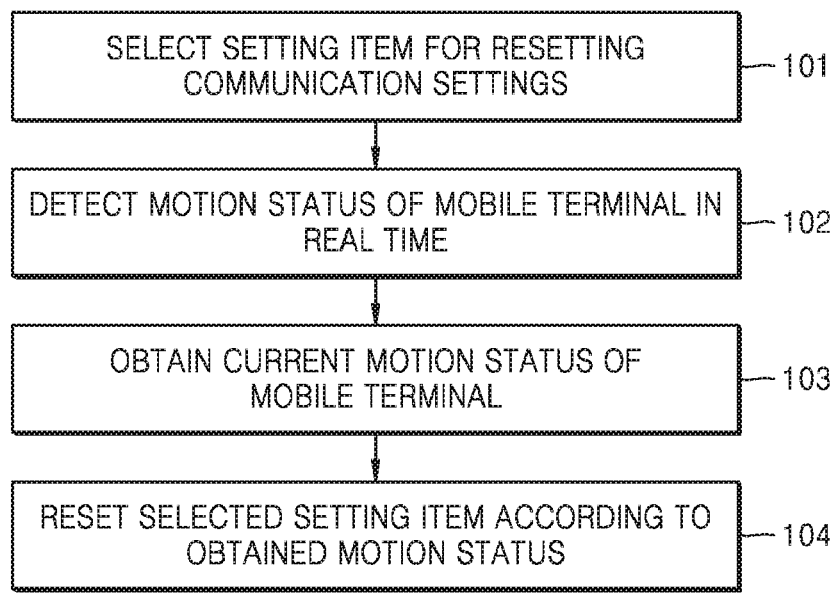
FIG. 1 is a schematic flowchart illustrating a communication method of a mobile terminal, according to an embodiment of the present disclosure.

FIG. 1 is a schematic flowchart illustrating a method for communication of a mobile terminal according to an embodiment of the present disclosure. The method includes the following operations.

In operation 101, a setting item for resetting communication settings is selected.

When the setting item for resetting communication settings is determined based on a motion status, at least one setting item may be selected. For example, at least one of fourteen items may be selected, which include an item for updating a motion status of an instant messaging user in real time, an item for updating a motion track of an instant messaging user in real time, an item for updating a motion status of a user in a call process in real time, an item for updating a motion status of a contact in an address list in real time, an item for a prompt of a motion status of a contact in an address list, an item for enabling a party assistant function in instant messaging, an item for enabling a real-time timing function for a contact in an address list, an item for automatically recommending participating in a group according to a motion status of a user, an item for automatically performing a prompt according to a motion status of a user, an item for automatically switching a device mode according to a motion status of a user, an item for automatically switching a topic mode according to a motion status of a user, an item for automatically switching a do-not-disturb mode according to a motion status of a user, an item for call control, and an item for status reply.

In operation 102, the motion status of the mobile terminal is detected in real time.

Multiple methods for detecting the motion status of the mobile terminal may be used. For example, a motion status of the mobile terminal may be detected by an inertia sensor, by a global positioning system (GPS), or by a combination of the inertia sensor and the GPS.

In operation 103, a current motion status of the mobile terminal is obtained.

A currently-detected motion status of the mobile terminal is obtained.

In operation 104, the selected setting item is reset according to the obtained motion status.

After obtaining the current motion status, the selected setting item may be reset. Because setting items are different, methods for resetting the setting items are different.

In an example of the present disclosure, the motion status of the mobile terminal is detected in real time, the current motion status of the mobile terminal is obtained, and the selected setting item is reset according to the obtained motion status. Accordingly, the communication setting may be performed automatically according to an actual motion status of the mobile terminal, thereby making the communication setting more accurate and intelligent.

Methods for detecting a motion status will now be described according to some examples.

In a first example, the motion status may be detected by an inertia sensor.

The mobile terminal may include an inertia sensor. For example, the inertia sensor may be an acceleration sensor or a gyroscope.

A method of detecting the motion status by the inertia sensor includes: periodically receiving output data of the inertia sensor and adding the output data to a storage queue; when the length of the storage queue is larger than a predefined value, processing data in the storage queue to extract a feature value; and finding the motion status from a table of mapping relationships between motion statuses and feature values according to the extracted feature value.

Further, the accuracy of motion status determination may be improved through the following methods.

The process of detecting the motion status by the inertia sensor may be repeated for N0 times, and the determined motion status may be recorded every time the process of detecting the motion status by the inertia sensor is performed.

The number of times each motion status is detected is counted and represented as N.

If a motion status S meets a condition of N>N0*m, the motion status S is determined as a final motion status, wherein 0<m<1.

The first example will now be described in detail.

A motion status of a user may be set as, for example, stopping, walking or taking a bus. Table 1 is a motion status classification table, and a motion status classification is not limited thereto.

TABLE 1

| Motion status classification table Motion Status |
|---|
| stillness |
| walking |
| running |
| riding |
| taking a bus |

For different motion statuses, output waveforms of the inertia sensor may be different. Through data processing for the output data of the inertia sensor, such as, filtering, subsection, and pattern identification, a feature value corresponding to each motion status may be extracted, as shown in Table 2. The feature value may be a set of values for representing a motion mode or a motion status, for example, an acceleration value per unit time.

TABLE 2

| Mapping relationships between motion statuses and feature values | |
|---|---|
| Motion Status | Feature Value |
| stillness | B1 |
| walking | B2 |
| running | B3 |
| riding | B4 |
| taking a bus | B5 |

Figure 2:
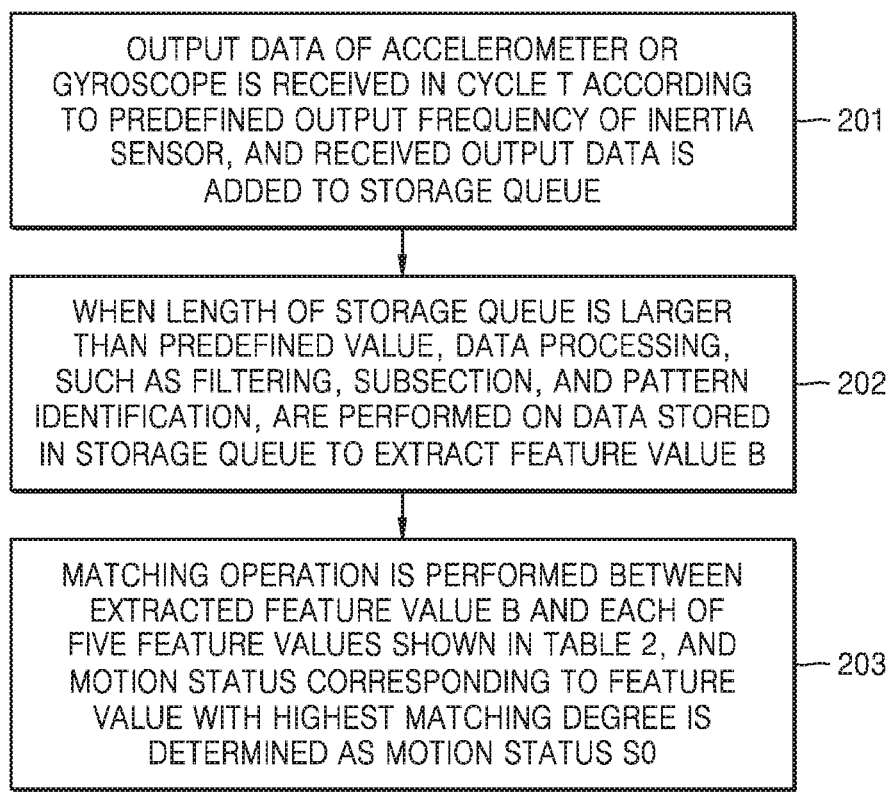
FIG. 2 is a flowchart of a method, performed by an inertia sensor, of determining a motion status, according to an embodiment of the present disclosure.

FIG. 2 is a flowchart of a method, performed by an inertia sensor, of determining a motion status, according to an embodiment of the present disclosure.

When a user starts a motion status detection setting, the motion status may be determined according to the flowchart shown in FIG. 2.

In operation 201, output data of an accelerometer or a gyroscope is received in a cycle T according to a predefined output frequency of the inertia sensor, and the received output data is added to a storage queue.

In operation 202, when the length of the storage queue is larger than a predefined value, data processing, such as filtering, subsection, and pattern identification, may be performed on the data stored in the storage queue to extract a feature value B.

In operation 203, a matching operation is performed between the extracted feature value B and each of the five feature values shown in Table 2, and a motion status corresponding to a feature value with a highest matching degree is determined as a motion status S0 according to the mapping relationships between the motion statuses and feature values shown in Table 2.

The table of mapping relationships between the motion statuses and the feature values represents normal correspondence relationships between the motion statuses and the feature values, and may be provided by a system. The system may make multiple experiences for the motion statuses in advance to obtain a feature value corresponding to each motion status.

In a second example, the motion status may be detected by a GPS.

A method of detecting the motion status by the GPS includes: obtaining starting location information of a user at a starting point of a time interval T and ending location information of the user at an ending point of the terminal interval T by the GPS, and calculating a movement velocity V corresponding to the time interval T; and finding a motion status from a table of mapping relationships between motion statuses and movement velocities according to the calculated movement velocity V.

The second example will now be described in detail.

For different motion statuses, movement distances obtained by the GPS in the same time interval are different, and thus calculated movement velocities are different. After obtaining real-time geographical location and time information of the user via time sampling and the GPS of the mobile terminal, a movement velocity corresponding to each motion status may be extracted, as shown in Table 3.

TABLE 3

| Mapping relationships between motion statuses and movement velocities | |
|---|---|
| Motion Status | Movement Velocity |
| stillness | V1 |
| walking | V2 |
| running | V3 |
| riding | V4 |
| taking a bus | V5 |

Figure 3:
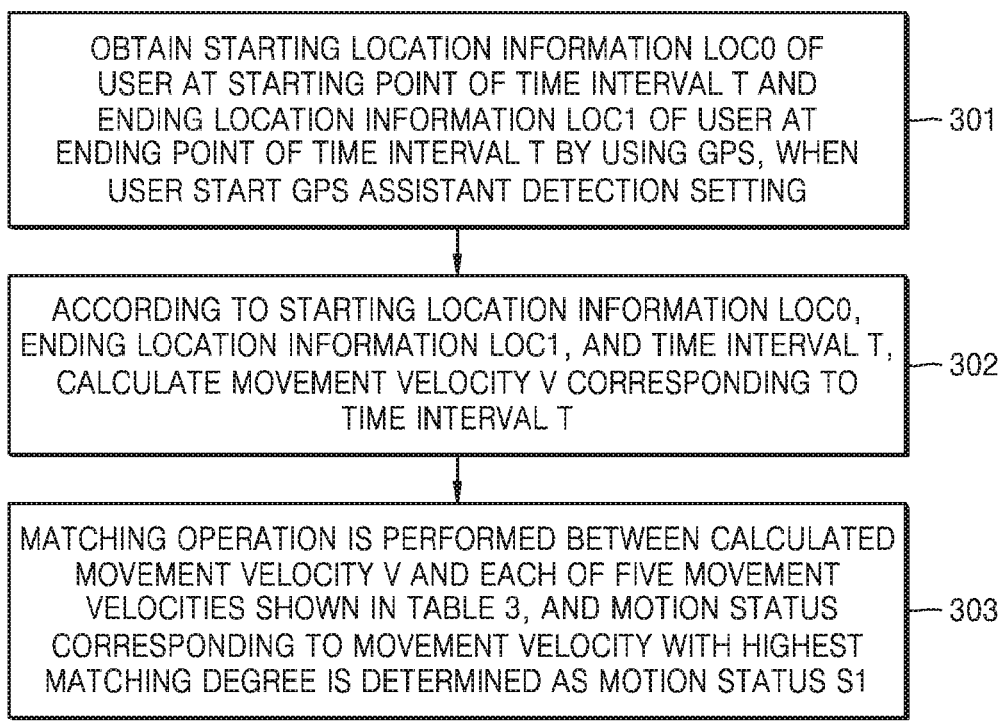
FIG. 3 is a flowchart of a method, performed by a global positioning system (GPS), of determining a motion status, according to an embodiment of the present disclosure.

When a user starts a GPS assistant detection setting, the motion status may be determined according to a flowchart shown in FIG. 3.

In operation 301, starting location information LOC0 of the user at the starting point of a time interval T and ending location information LOC1 of the user at the ending point of the time interval T may be obtained by the GPS.

In operation 302, according to the starting location information LOC0, the ending location information LOC1, and the time interval T, a movement velocity V corresponding to the time interval T is calculated.

In operation 303, a matching operation is performed between the calculated movement velocity V and each of the five movement velocities shown in Table 3, and a motion status corresponding to a movement velocity with a highest matching degree is determined as a motion status S1 according to the mapping relationships between the motion statuses and movement velocities shown in Table 3.

The table of mapping relationships between the motion statuses and the movement velocities represents a normal correspondence relationship between the motion statuses and the movement velocities, and may be provided by a system. The system may make multiple experiences for the motion statuses in advance to obtain a movement velocity corresponding to each motion status.

In a third example, the motion status may be detected by a combination of an inertia sensor and a GPS.

A method of detecting the motion status via the combination of the inertia sensor and the GPS includes: periodically receiving output data of the inertia sensor, and adding the output data to a storage queue; obtaining location information LOC0 through the GPS when a first piece of data is added to the storage queue, and obtaining location information LOC1 through the GPS when a length of the storage queue is larger than a predefined value; processing the data in the storage queue to extract a feature value, and finding a motion status S0 corresponding to the feature value from the table of mapping relationships between the motion statuses and the feature values; calculating a movement velocity V according to the location information LOC0, the location information LOC1, and a time interval between LOC0 and LOC1, and finding a motion status S1 corresponding to the movement velocity V from the table of the mapping relationships between the motion statuses and the movement velocities; and repeating the process of obtaining S0 and S1 for N0 times, adding 1 to the value of a judging number counter every time a process of obtaining the motion statuses S0 and S1 is performed, and recording the currently obtained motion statuses S0 and S1; adding 1 to the value of a same status number counter when S0 is identical to S1, and resetting the same status number counter when S0 is not identical to S1; and when the value of the judging number counter is larger than a predefined value M0 or the value of the same status number counter is larger than M1, determining the current motion status S0 as a final motion status, wherein M0 is larger than or equal to M1.

The third example will now be described in detail.

Figure 4:
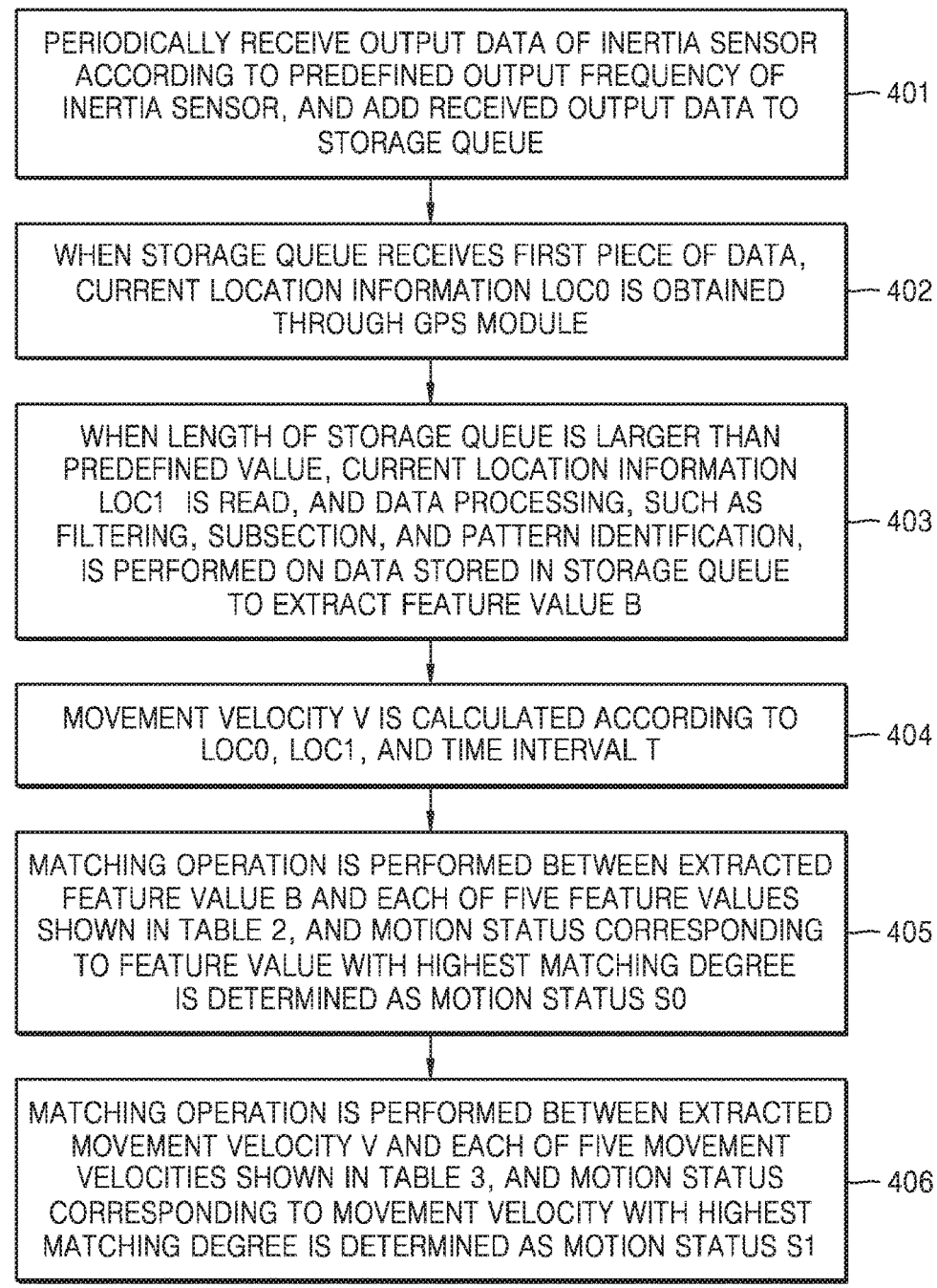
FIG. 4 is a flowchart of a process of outputting motion statuses S0 and S1 when they are determined by a combination of an inertia sensor and a GPS.

When a user starts a motion status detection and GPS assistant determination setting, there are two options including S0 and S1. S0 is the motion status output by the inertia sensor, and S1 is the motion status output by the GPS. A process of outputting the motion statuses S0 and S1 is shown in FIG. 4.

In operation 401, the output data of the inertia sensor is received periodically according to a predefined output frequency of the inertia sensor, and is added to a storage queue.

In operation 402, when the storage queue receives the first piece of data, current location information LOC0 is obtained through a GPS module.

In operation 403, when the length of the storage queue is larger than a predefined value, current location information LOC1 is read, and the data processing, such as filtering, subsection, and pattern identification, is performed on the data stored in the storage queue to extract a feature value B.

In operation 404, a movement velocity V is calculated according to LOC0, LOC1, and a time interval T.

In operation 405, a matching operation is performed between the extracted feature value B and each of the five feature values shown in Table 2, and a motion status corresponding to a feature value with a highest matching degree is determined as the motion status S0.

In operation 406, a matching operation is performed between the extracted movement velocity V and each of the five movement velocities shown in Table 3, and a motion status corresponding to a movement velocity with a highest matching degree is determined as the motion status S1.

Figure 5:
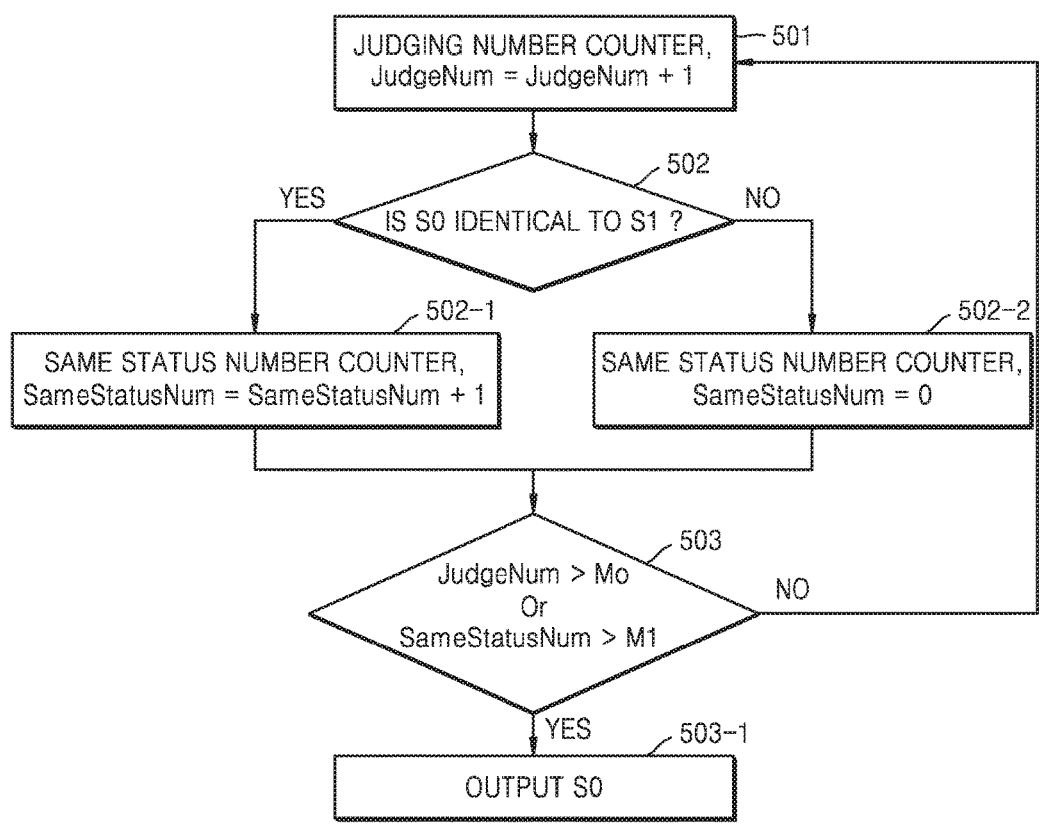
FIG. 5 is a flowchart of a process of outputting a final motion status, based on the motion statuses S0 and S1, according to an embodiment of the present disclosure.

A constant M0 is set as a threshold of the judging number counter, and a constant M1 is set as a threshold of the same status number counter. The process shown in FIG. 4 is repeated for N0 times. Every time the process shown in FIG. 4 is performed, the judging number counter is increased by 1, and the currently obtained motion statuses S0 and S1 are recorded. A process of determining a motion status according to the motion statuses S0 and S1 is shown in FIG. 5.

In operation 501, every time the process of FIG. 4 is performed, the judging number counter called JudgeNum is increased by 1, and the currently obtained motion statuses S0 and S1 are recorded.

In operation 502, it is determined whether S0 is identical to S1. If S0 is identical to S1, the same status number counter called SameStatusNum is increased by 1 (in operation 502-1), and if S0 is not identical to S1, the same status number counter called SameStatusNum is reset (in operation 502-2).

When the value of the judging number counter is larger than M0 or the value of the same status number counter is larger than M1 in operation 503, the current motion status S0 is output, in operation 503-1.

In the flowchart of FIG. 1, after obtaining the current motion status, the selected setting item may be reset. For different setting items, methods for resetting the setting items are different. The methods for resetting the setting items include:

1) updating a motion status of a user displayed on an instant messaging interface;
2) updating a motion track of a user displayed on an instant messaging interface;
3) updating a motion status of a user displayed in a call process;
4) updating a motion status of a contact displayed in an address list;
5) updating a prompt of a motion status of a contact displayed in an address list;
6) enabling a party assistant function in instant messaging;
7) enabling a real-time timing function for a contact in an address list;
8) automatically recommending participating in a group according to a motion status of a user;
9) automatically performing a prompt according to a motion status of a user;
10) automatically switching a device mode according to a motion status of a user;
11) automatically switching a topic mode according to a motion status of a user;
12) automatically switching a do-not-disturb mode according to a motion status of a user;
13) adaptively adjusting an incoming call ringtone and a call volume; and
14) automatically performing a status reply for an unanswered incoming call or for no reply for a long time in instant messaging.

Hereinafter, several implementations are described according to an embodiment.

In a first implementation, the setting item is an item for updating a motion status of an instant messaging user in real time, and a method of resetting the selected setting item according to the obtained motion status includes sending the obtained motion status of the instant messaging user to an instant messaging server, to inform the instant messaging server to update the motion status displayed on the instant messaging interface according to the obtained motion status of the instant messaging user.

The first implementation will now be described in detail.

Figure 6:
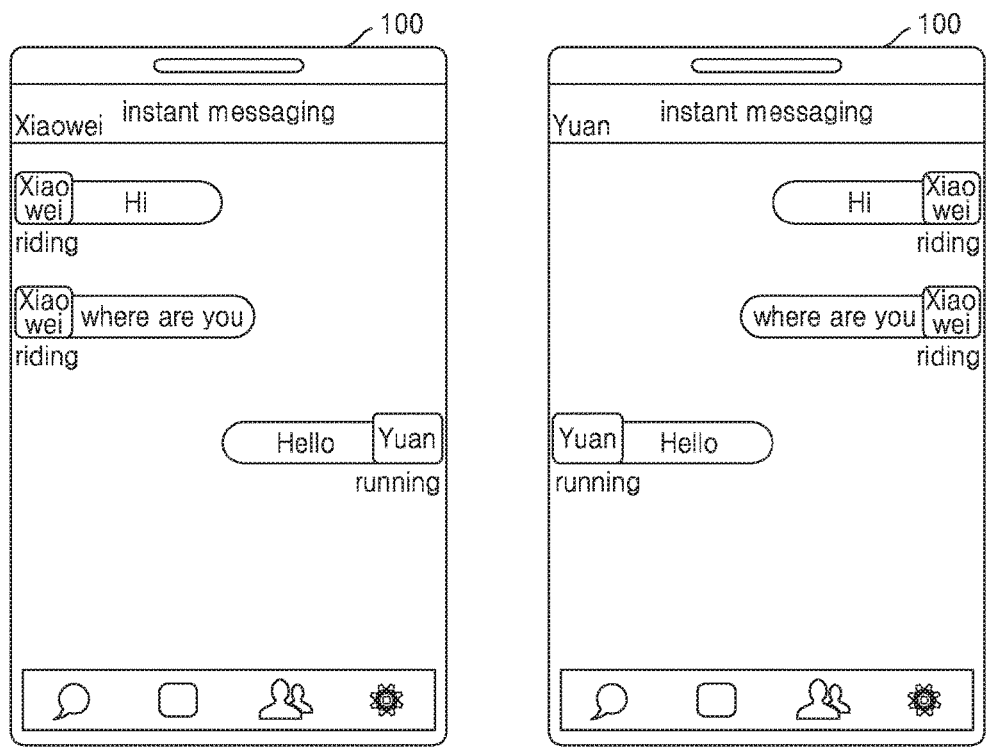
FIG. 6 shows interfaces for updating a motion status displayed on an instant messaging interface according to an embodiment of the present disclosure.

In the first implementation, the motion status of a user displayed on the instant messaging interface may be updated. When the setting item for updating the motion status of the instant messaging user in real time is started, a current motion status of the user may be obtained by querying an output motion status result of the user, and the motion status displayed on the instant messaging interface may be updated according to the obtained motion status of the user. If the obtained motion status of the user is null, the motion status displayed on the instant messaging interface cannot not be updated. The process of obtaining the motion status of the user and updating the displayed motion status may be performed periodically. FIG. 6 shows a process of updating the motion status displayed on the instant messaging interface according to an embodiment. A mobile terminal 100 may update the motion status of the instant messaging user displayed on the instant messaging interface in response to execution of an instant message application, based on the motion status of the user. The motion statuses of two instant messaging parties are displayed on an instant messaging interface, and are updated periodically.

In a second implementation, the setting item is an item for updating a motion track of an instant messaging user in real time, and a method of resetting the selected setting item according to the obtained motion status includes obtaining a current motion status of the instant massaging user, determining a motion track of the instant messaging user within a period of time according to the current motion status and time information obtained through time sampling, and sending the motion track of the instant messaging user within the period of time to an instant messaging server, to inform the instant messaging server to update the motion track displayed on the instant messaging interface according to the obtained motion track of the instant messaging user.

The second implementation will now be described in detail.

Figure 7:
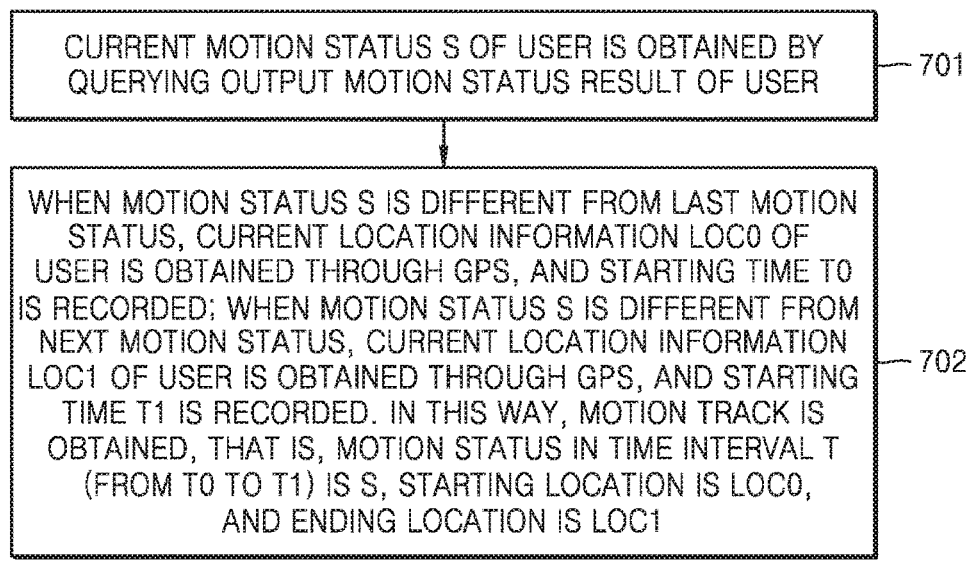
FIG. 7 is a flowchart of a method of determining a motion track, according to an embodiment of the present disclosure.

In the second implementation, the motion track of a user displayed on the instant messaging interface may be updated. When the setting item for updating the motion track of the instant messaging user in real time is started, a current motion status of the user may be obtained by querying an output motion status result of the user, and the motion track displayed on the instant messaging interface may be updated according to the obtained current motion status and time information obtained through time sampling. The motion track displayed on the instant messaging interface may be updated according to the obtained motion track of the instant messaging user. A process of determining the motion track is shown in FIG. 7.

In operation 701, a current motion status S of a user may be obtained from an output motion status result of the user.

In operation 702, when the motion status S is different from a last motion status, current location information LOC0 of the user is obtained through a GPS, and a starting time T0 is recorded; when the motion status S is different from a next motion status, current location information LOC1 of the user is obtained through the GPS, and a starting time T1 is recorded. In this way, the motion track is obtained. In other words, a motion status in a time interval T (from T0 to T1) is S, a starting location is LOC0, and an ending location is LOC1.

In a third implementation, the setting item is an item for updating a motion status in a call process in real time, and a method of resetting the selected setting item according to the obtained motion status includes sending the obtained motion status of the user to a call server, to inform the call server to update the motion status displayed in the call process according to the obtained motion status of the user.

The motion status of the user may be displayed as characters, pictures, animations, or multimedia on a user interface (UI) of instant messaging, and the display mode is not limited.

The third implementation will now be described in detail.

Figure 8:
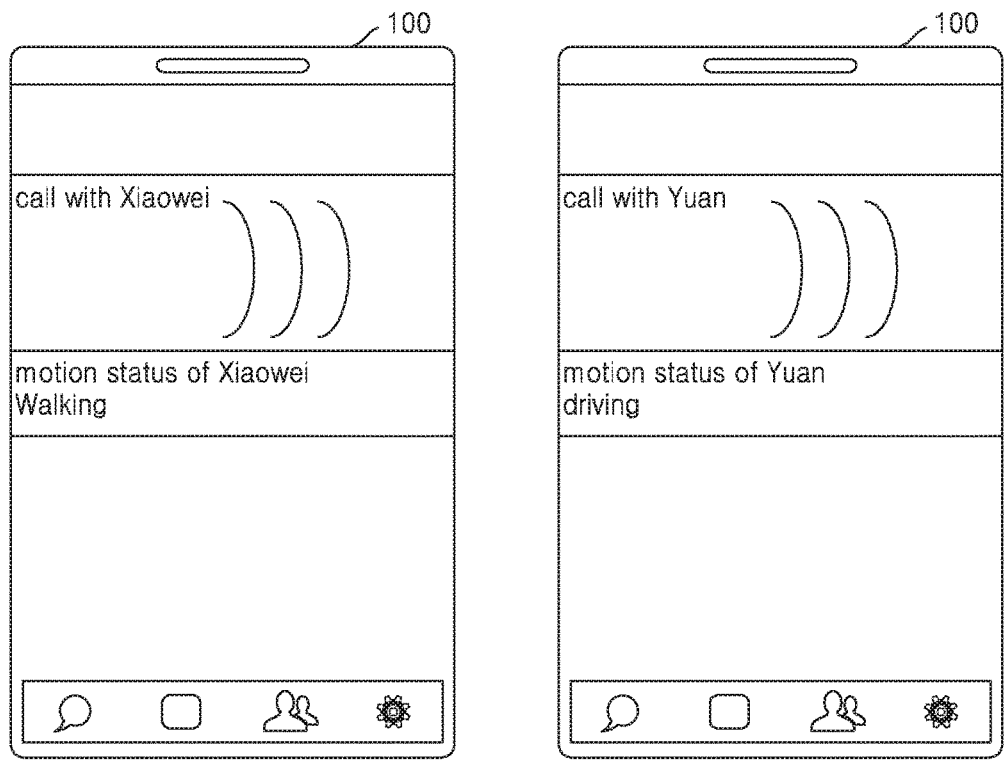
FIG. 8 shows interfaces for updating a motion status displayed in a call process according to an embodiment of the present disclosure.

In the call process, the current motion status of the user may be obtained by querying an output motion status result of the user. The motion status displayed on a call interface in the call process may be obtained according to the obtained motion status of the user. If the obtained motion status of the user is null, the motion status display on the call interface in the call process is not updated. The process of obtaining the motion status of the user and updating the displayed motion status may be performed periodically. FIG. 7 shows a process of updating the call interface displayed in the call process according to an embodiment. A call interface of a local mobile terminal may display a motion status of an opposite party and may periodically update the motion status of the opposite party. FIG. 8 shows display interfaces of Xiaowei and Yuan during their call process. The mobile terminal 100 may update the motion status of the opposite party displayed on the call interface in response to execution of a call application, based on the motion status of the user.

In a fourth implementation, the setting item is an item for updating a motion status of a contact in an address list in real time, and a method of resetting the selected setting item according to the obtained motion status includes sending the obtained motion status of the contact to an instant messaging server, to inform the instant messaging server to update the motion status of the contact displayed in the address list according to the obtained motion status of the contact.

The fourth implementation will now be described in detail.

Figure 9:
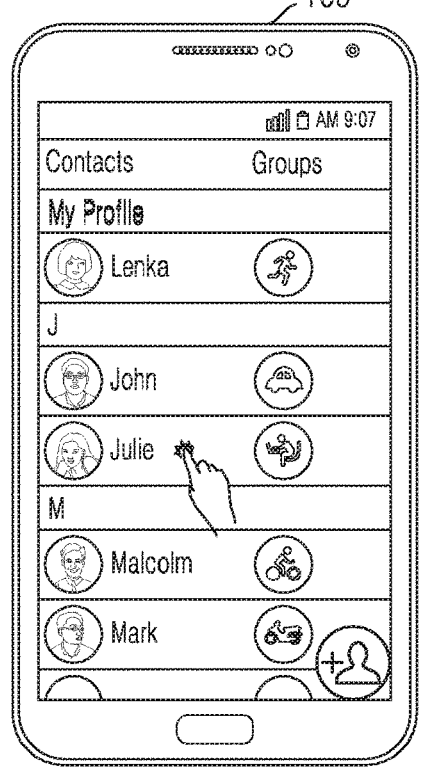
FIG. 9 shows interfaces for updating a motion status of a contact in an address list, according to an embodiment of the present disclosure.
Figure 9:
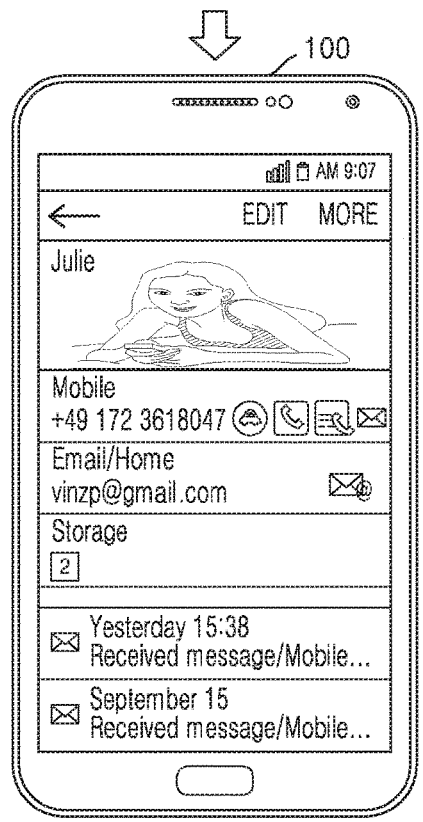

FIG. 9 shows interfaces for updating a motion status of a contact in an address list, according to an embodiment of the present disclosure. The mobile terminal 100 may update motion statuses of contacts displayed in the address list in response to execution of an address list application, based on the motion status of the user. Alternatively, when the user selects a specific contact in the address list, a motion state of the selected contact may be updated together with details related with the selected contact.

When the address list is opened, a current motion status of the contact is obtained by querying an output motion status result of the contact. The obtained motion status of the contact is sent to the instant messaging server, to inform the instant messaging server to update the motion status of the contact displayed in the address list according to the obtained motion status of the contact. The motion status may be displayed as characters, pictures, animations, or multi-media on a UI of instant messaging, and the display mode is not limited.

In a fifth implementation, the setting item is an item for a prompt of a motion status of a contact in an address list, and a method of resetting the selected setting item according to the obtained motion status includes obtaining a motion status or motion status change of the contact, and, when the motion status or the motion status change of the contact matches a to-be-monitored preset motion status or motion status change of the contact, prompting a user according to a predefined system prompting mode corresponding to the motion status or the motion status change of the contact.

The fifth implementation will now be described in detail.

Figure 10:
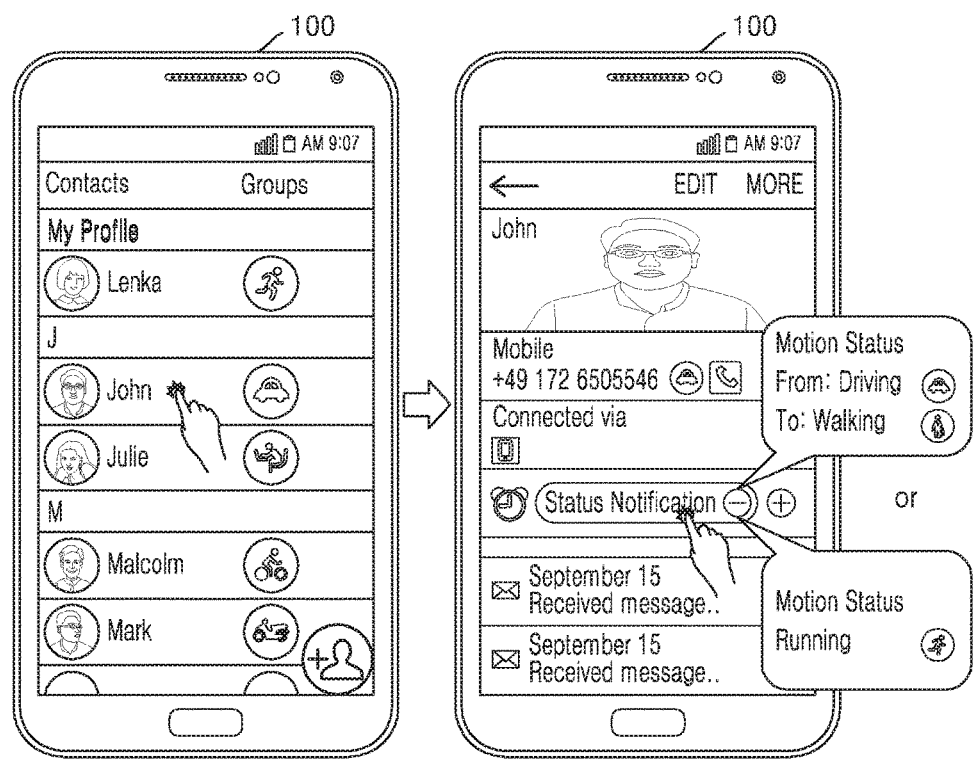
FIG. 10 shows interfaces prompted to the user when the motion status of a contact displayed in the address list changes according to a predefined mode or when the motion status of the contact is a predefined motion status, according to an embodiment of the present disclosure.

FIG. 10 shows interfaces prompted to the user when the motion status of a contact displayed in the address list changes according to a predefined mode or when the motion status of the contact is a predefined motion status, according to an embodiment of the present disclosure. A user of the mobile terminal 100 may select a certain condition such that, when a motion status of a specific contact in the address list is under the certain condition, the user of the mobile terminal 100 is informed. Consequently, when the motion status of the contact changes from driving to walking, the mobile terminal 100 may inform the user of the status change, or, when the motion status of the contact becomes running, the mobile terminal 100 may inform the user of this fact.

In the fifth implementation, when the motion status of the contact changes according to a predefined mode or the contact is in a predefined motion status, the user is prompted according to a predefined system prompting mode.

When the setting item for prompt of the motion status of the contact in the address list is started, a current motion status of the contact may be obtained by querying an output motion status result of the contact, and a to-be-monitored motion status or motion status change of the contact may be found from a table of predefined mapping relationships between contacts and motions (as shown in Table 4). When the current motion status or the motion status change of the contact matches the to-be-monitored preset motion status or motion status change of the contact, the user is prompted according to a system prompting mode.

TABLE 4

Mapping relationships between contacts and prompt of motion statuses

| Contact | Prompt of Motion Status | Notification to System |
|---|---|---|
| contact A | from "driving" to "walking" | ring |
| contact B | running | vibration + ring |
| contact C | riding | vibration + ring |
| . . . | . . . | . . . |

In a sixth implementation, the setting item is an item for enabling a party assistant function in instant messaging, and a method of resetting the selected setting item according to the obtained motion status includes querying and obtaining a motion track of each party member, and sending the motion track and location information of each party member to an instant messaging server, to inform the instant messaging server to display the motion track and the location information of each party member on a group interface of instant messaging in real time.

The sixth implementation will now be described in detail.

Figure 11:
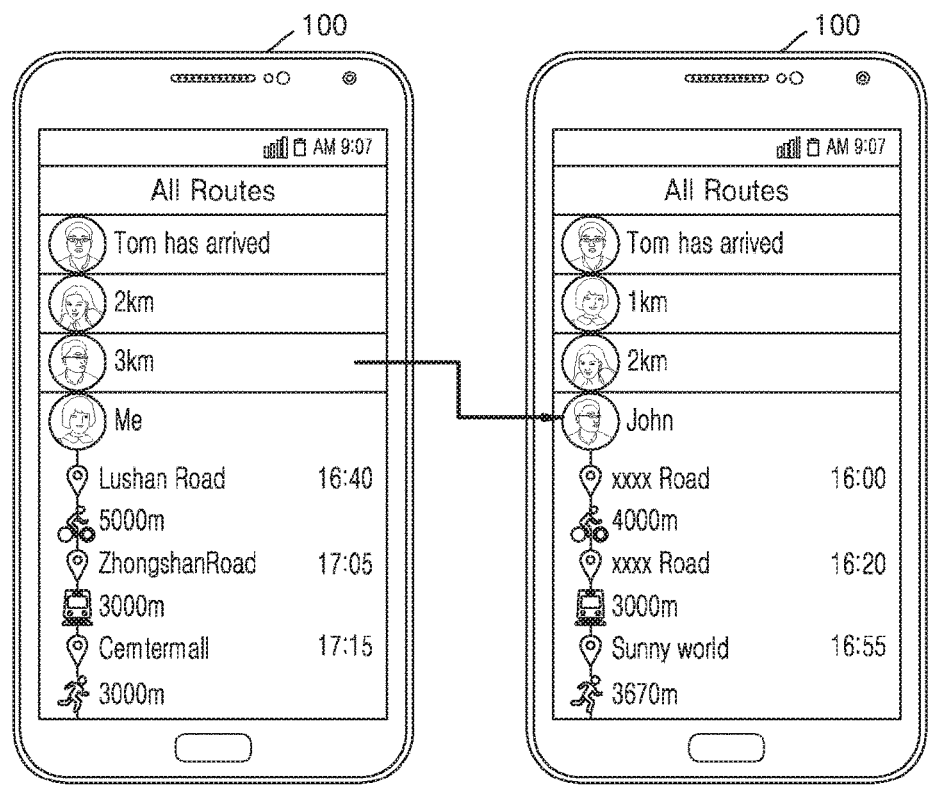
FIG. 11 shows interfaces that display the motion track and the location information of each party member in real time according to a party assistant function in instant messaging, according to an embodiment of the present disclosure.

FIG. 11 shows interfaces that display the motion track and the location information of each party member in real time according to a party assistant function in instant messaging, according to an embodiment of the present disclosure.

In the sixth implementation, when everybody participates in a party, a group is created in instant messaging, and the motion track and location information of each party member is displayed on a group interface in real time.

When the setting item for enabling a party assistant function in instant messaging, the motion track of each party member is queried and obtained in real time. The motion track and location information of each party member is sent to the instant messaging server, to inform the instant messaging server to display the motion track and the location information of each party member on the group interface of instant messaging in real time.

In a seventh implementation, the setting item is an item for enabling a real-time timing function for a contact in an address list, and a method of resetting the selected setting item according to the obtained motion status includes querying and obtaining a current motion status of the contact, finding a destination corresponding to the contact from a table of predefined mapping relationships between contacts and destinations, obtaining a real-time geographical location of the contact through a GPS, calculating a physical distance from a current location of the contact to the destination, calculating a time period required by the contact from the current location to the destination, and displaying the motion status of the contact and the time period required by the contact from the current location to the destination on a UI in real time.

The seventh implementation will now be described in detail.

Figure 12:
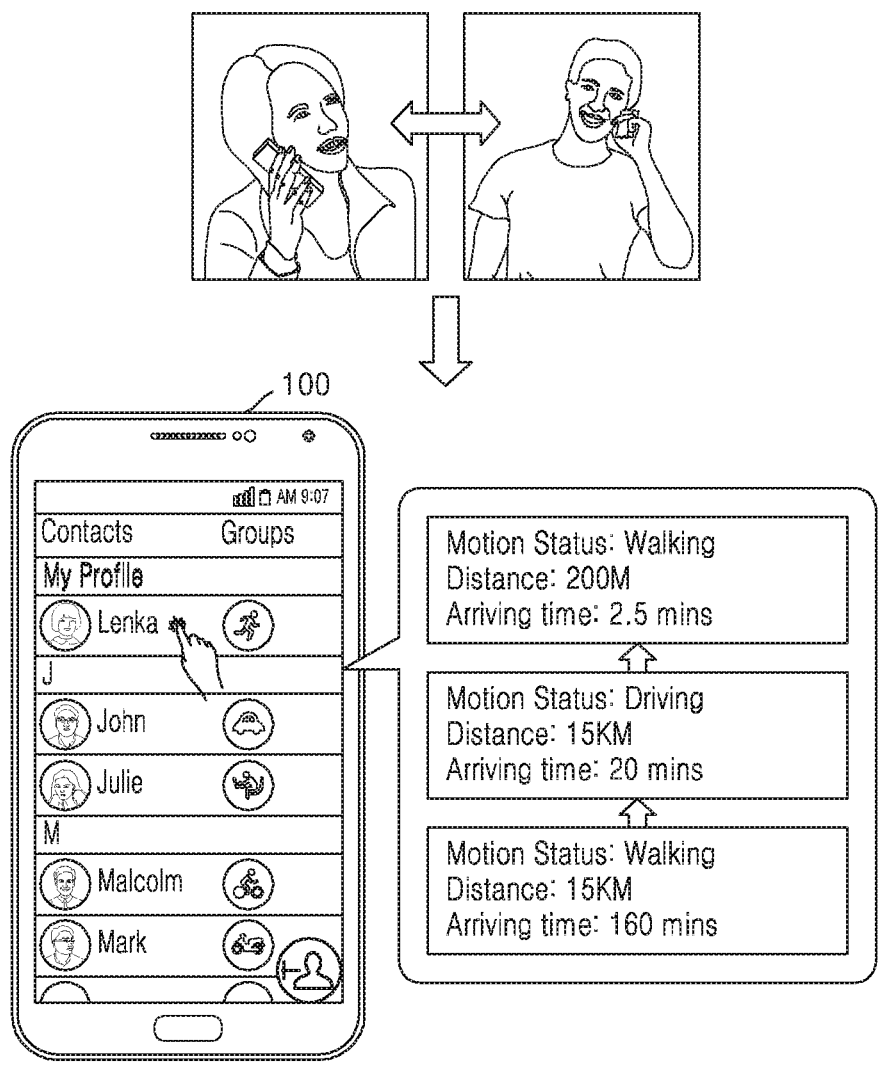
FIG. 12 shows a process of performing a real-time timing function for a contact in an address list, according to an embodiment of the present disclosure.

FIG. 12 shows a process of performing a real-time timing function for a contact in an address list, according to an embodiment of the present disclosure. The mobile terminal 100 may display, in real time, a motion status of the contact in the address list and a time period required by the contact from a current location to a destination on a UI in response to execution of a real-time timing function for the contact, based on the motion status of the user. When the motion status is changed, the time period required by the contact in the address list from the current location to the destination may be changed according to a changed motion status.

In the seventh implementation, a time period required by the user from a current location of the user to a destination is calculated in real time according to a current motion status of the user.

When the address list is opened, if the setting item for enabling the real-time timing function for the contact in the address list is started, a current motion status of the contact may be queried and obtained, and the destination corresponding to the contact may be found from the table of predefined mapping relationships between contacts and destinations (as shown in Table 5). The real-time geographical location of the contact is obtained through a GPS, the physical distance from the current location of the contact to the destination is calculated, the time period required by the contact from the current location to the destination is calculated according to the current motion status of the contact, and the motion status of the contact and the time period required by the contact from the current location to the destination are displayed on the UI in real time.

TABLE 5

Mapping relationships between contacts and destinations

| Contact | Destination |
|---|---|
| contact A | destination 1 |
| contact B | destination 2 |

TABLE 5-continued

Mapping relationships between contacts and destinations

| Contact | Destination |
| --- | --- |
| contact C | destination 3 |
| ... | ... |

In an eighth implementation, the setting item is an item for automatically recommending participating in a group according to a motion status of a user, and a method of resetting the selected setting item according to the obtained motion status includes obtaining a current motion status of the user, finding a recommended group corresponding to the current motion status of the user from a table of predefined mapping relationships between motion statuses and recommended groups, and recommending the user to participate in the recommended group.

The eighth implementation will now be described in detail.

Figure 13:
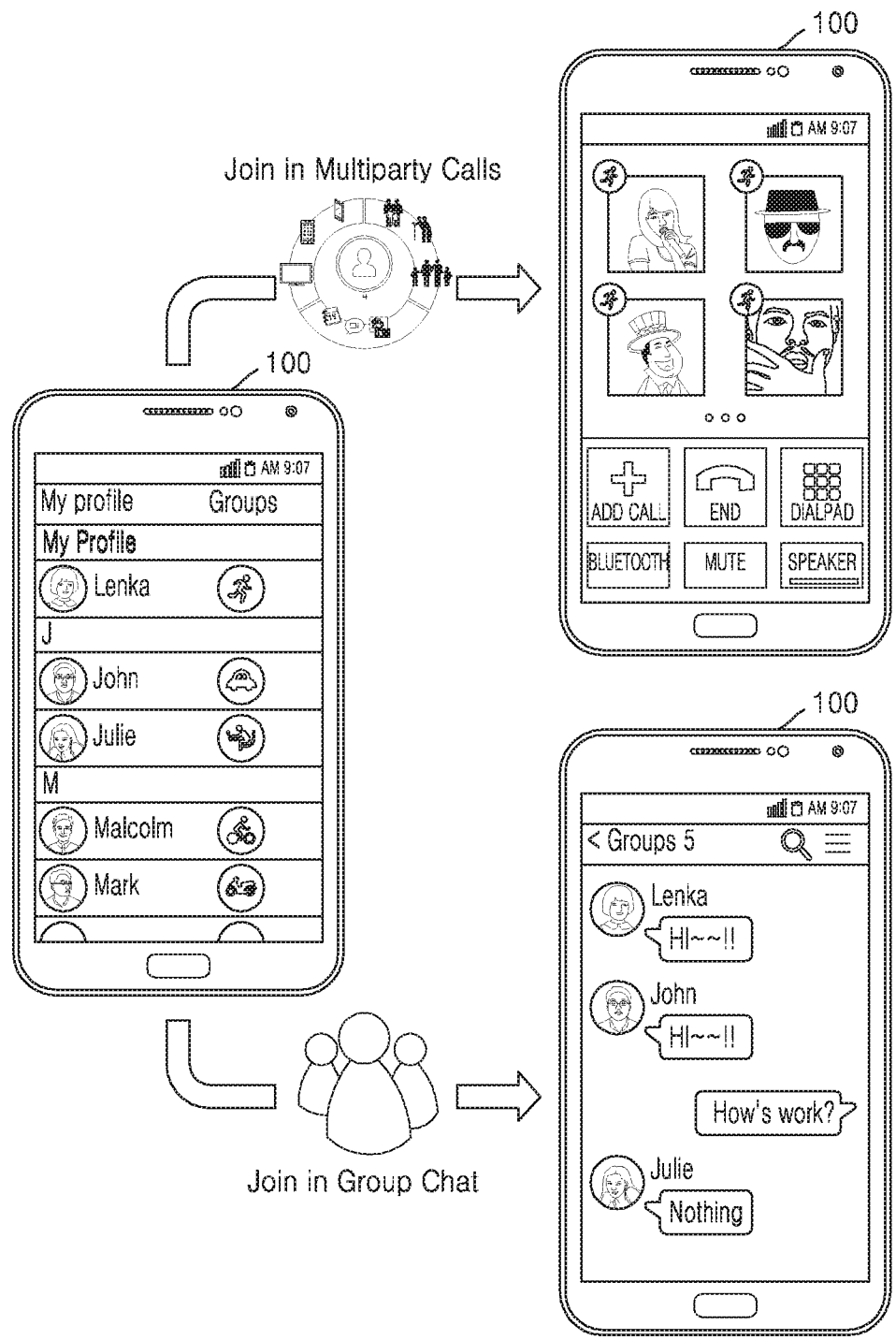
FIG. 13 illustrates a process of automatically recommending participating in a group according to a motion status of a user, according to an embodiment of the present disclosure.

FIG. 13 illustrates a process of automatically recommending participating in a group according to a motion status of a user, according to an embodiment of the present disclosure.

In the eighth implementation, the user is recommended to participate in the group according to a current motion status of the user. When the setting item for automatically recommending participating in the group according to the motion status of the user is started, the current motion status of the user is obtained by querying an output motion status result of the user. The recommended group corresponding to the motion status of the user may be found from the table of predefined mapping relationships between motion statuses and recommended groups (as shown in Table 6), and the user is recommended to participate in the recommended group.

TABLE 6

Mapping relationships between motion statuses and groups

| Motion Status | Recommended Group |
| --- | --- |
| stillness | group chat |
| walking | multiparty call |
| running | multiparty call |
| riding | multiparty call |
| taking a bus | group chat |
| ... | ... |

In a ninth implementation, the setting item is an item for automatically performing prompt according to a motion status of a user, and a method of resetting the selected setting item according to the obtained motion status includes obtaining a current motion status of the user, finding an automatic prompting function corresponding to the current motion status of the user from a table of predefined mapping relationships between motion statuses and automatic prompting functions, and pushing prompting information corresponding to the automatic prompting function to the user.

The ninth implementation will now be described in detail.

In the ninth implementation, the prompting information is pushed automatically according to the current motion status of the user, thereby simplifying operations of the user. When the setting item for automatically performing prompt according to the motion status of the user is started, the current motion status of the user is obtained by querying an output motion status result of the user. The automatic prompting function corresponding to the motion status of the user may be found from the table of predefined mapping relationships between motion statuses and automatic prompting functions (as shown in Table 7), and prompting information corresponding to the automatic prompting function is pushed to the user.

TABLE 7

Mapping relationships between motion statuses and automatic prompting functions

| Motion Status | Automatic Prompting Function |
| --- | --- |
| stillness | schedule |
| walking | schedule |
| running | health knowledge |
| riding | health knowledge |
| taking a bus | traffic condition |
| ... | ... |

In a tenth implementation, the setting item is an item for automatically switching a device mode according to a motion status of a user, and a method of resetting the selected setting item according to the obtained motion status includes obtaining a current motion status of the user, finding a device mode corresponding to the current motion status of the user from a table of predefined mapping relationships between motion statuses and device modes, and switching a device mode of a system to the obtained device mode.

The tenth implementation will now be described in detail.

Figure 14:
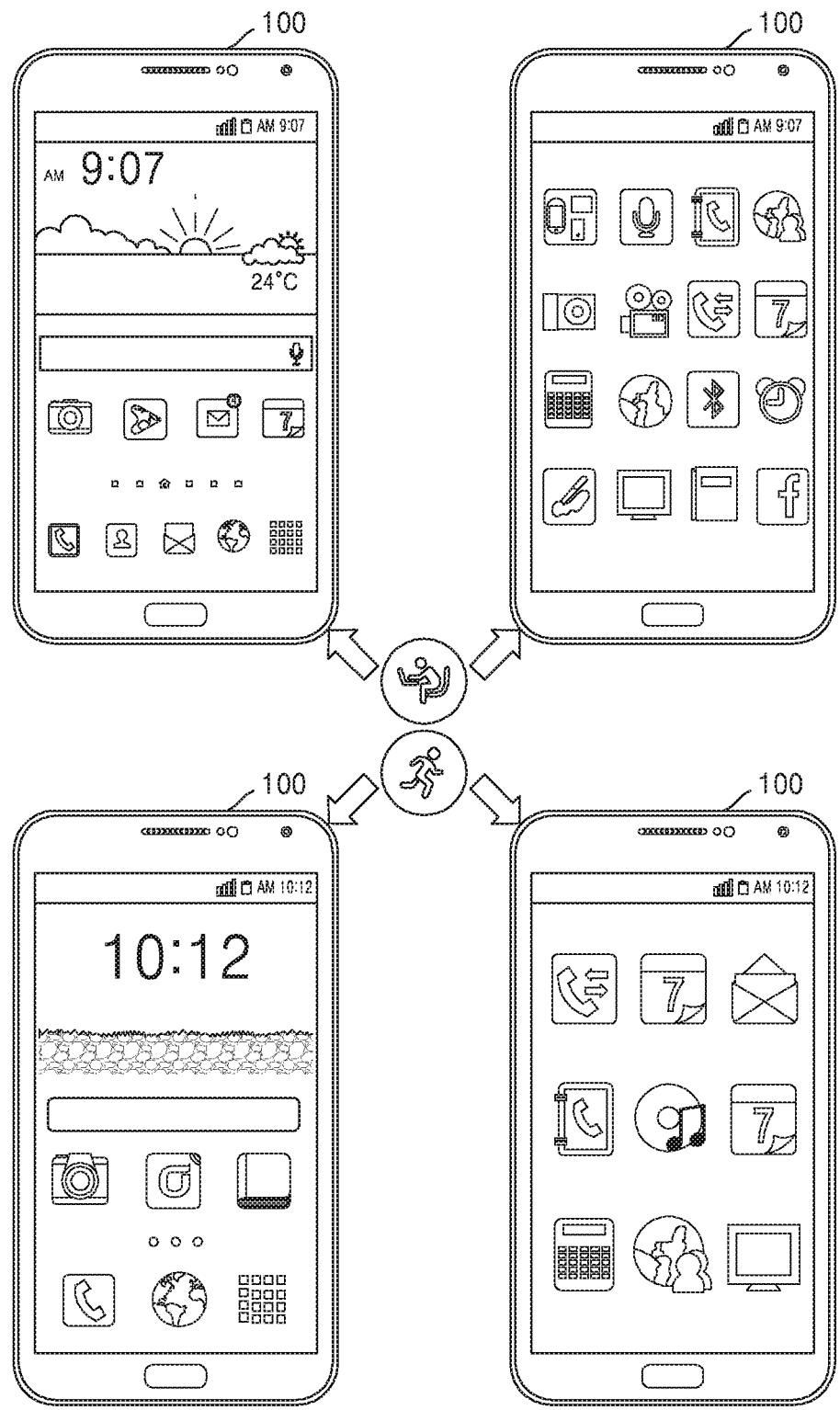
FIG. 14 illustrates interfaces on which a device mode is automatically switched according to a motion status of a user, according to an embodiment of the present disclosure.

FIG. 14 illustrates interfaces on which a device mode is automatically switched according to a motion status of a user, according to an embodiment of the present disclosure. The mobile terminal 100 may automatically switch a device mode in response to execution of the mobile terminal 100, based on the motion status of the user.

In the eighth implementation, the device mode is switched automatically according to a current motion status of the user. In a simple mode, a large font, a simple home screen layout, and an intuitive application make the user use devices easily. When the setting item for automatically switching the device mode according to the motion status of the user is started, the current motion status of the user is obtained by querying an output motion status result of the user. The device mode corresponding to the motion status of the user may be found from the table of predefined mapping relationships between motion statuses and device modes (as shown in Table 8), and the device mode of the system is switched automatically to the obtained device mode.

TABLE 8

Mapping relationships between motion statuses and device modes

| Motion Status | Device Mode |
| --- | --- |
| stillness | standard mode |
| walking | simple mode |
| running | simple mode |
| riding | simple mode |
| taking a bus | simple mode |
| ... | ... |

In an eleventh implementation, the setting item is an item for automatically switching a topic mode according to a motion status of a user, and a method of resetting the selected setting item according to the obtained motion status includes obtaining a current motion status of the user, finding a topic mode corresponding to the current motion status of the user from a table of predefined mapping relationships between motion statuses and topic modes, and switching a topic mode of a system to the obtained topic mode.

The eleventh implementation will now be described in detail.

In the eleventh implementation, the topic mode is switched automatically according to a current motion status of the user. When the setting item for automatically switching the topic mode according to the motion status of the user is started, the current motion status of the user is obtained by querying an output motion status result of the user. The topic mode corresponding to the motion status of the user may be found from the table of predefined mapping relationships between motion statuses and topic modes (as shown in Table 9), and the topic mode of the system is switched automatically to the obtained topic mode.

TABLE 9

Mapping relationships between motion statuses and topic modes

| Motion Status | Topic Mode |
|---|---|
| stillness | topic mode 1 |
| walking | topic mode 2 |
| running | topic mode 3 |
| riding | topic mode 4 |
| taking a bus | topic mode 5 |
| ... | ... |

In a twelfth implementation, the setting item is an item for automatically switching a do-not-disturb mode according to a motion status of a user, and a method of resetting the selected setting item according to the obtained motion status includes obtaining a current motion status of the user, finding a do-not-disturb mode corresponding to the current motion status of the user from a table of predefined mapping relationships between motion statuses and do-not-disturb modes, and switching a do-not-disturb mode of a system to the obtained do-not-disturb mode.

The twelfth implementation will now be described in detail.

In the twelfth implementation, the do-not-disturb mode is switched automatically according to a current motion status of the user. When the setting item for automatically switching the do-not-disturb mode according to the motion status of the user is started, the current motion status of the user is obtained by querying an output motion status result of the user. The do-not-disturb mode corresponding to the motion status of the user may be found from the table of predefined mapping relationships between motion statuses and do-not-disturb modes (as shown in Table 10), and the do-not-disturb mode of the system is switched automatically to the obtained do-not-disturb mode.

TABLE 10

Mapping relationships between motion statuses and do-not-disturb modes

| Motion Status | Do-not-disturb Mode |
|---|---|
| stillness | close |
| walking | close |
| running | start |
| riding | start |
| taking a bus | start |
| ... | ... |

In a thirteenth implementation, the setting item is an item for call control, and a method of resetting the selected setting item according to the obtained motion status includes, if a setting of "automatically adjusting an incoming call ringtone according to a motion status of a user when an incoming call rings" is started, finding an incoming call ringtone type and an incoming call ringtone volume from a table of predefined mapping relationships between motion statuses and incoming call ringtones (as shown in Table 11) according to the obtained motion status of the user, and adjusting the incoming call ringtone of the system into the found ringtone type and ringtone volume.

TABLE 11

Mapping relationships between motion statuses and incoming call ringtones

| Motion Status | Incoming call ringtone Type | Incoming call ringtone Volume |
|---|---|---|
| stillness | vibration | zero |
| walking | ring | 25 |
| running | ring | 40 |
| riding | vibration + ring | 50 |
| taking a bus | vibration + ring | 60 |

If a setting of "automatically adjusting a call volume according to a motion status of a user in a call process" is started, the method of resetting the selected setting item according to the obtained motion status includes finding a call volume from a table of predefined mapping relationship between motion statuses and call volumes (as shown in Table 12) according to the obtained motion status of the user, and adjusting the call volume of the system into the found call volume.

TABLE 12

Mapping relationships between motion statuses and call volumes

| Motion Status | Call Volume |
|---|---|
| stillness | 10 |
| walking | 25 |
| running | 40 |
| riding | 50 |
| taking a bus | 60 |
| ... | |

The thirteenth implementation will now be described in detail.

Figure 15:
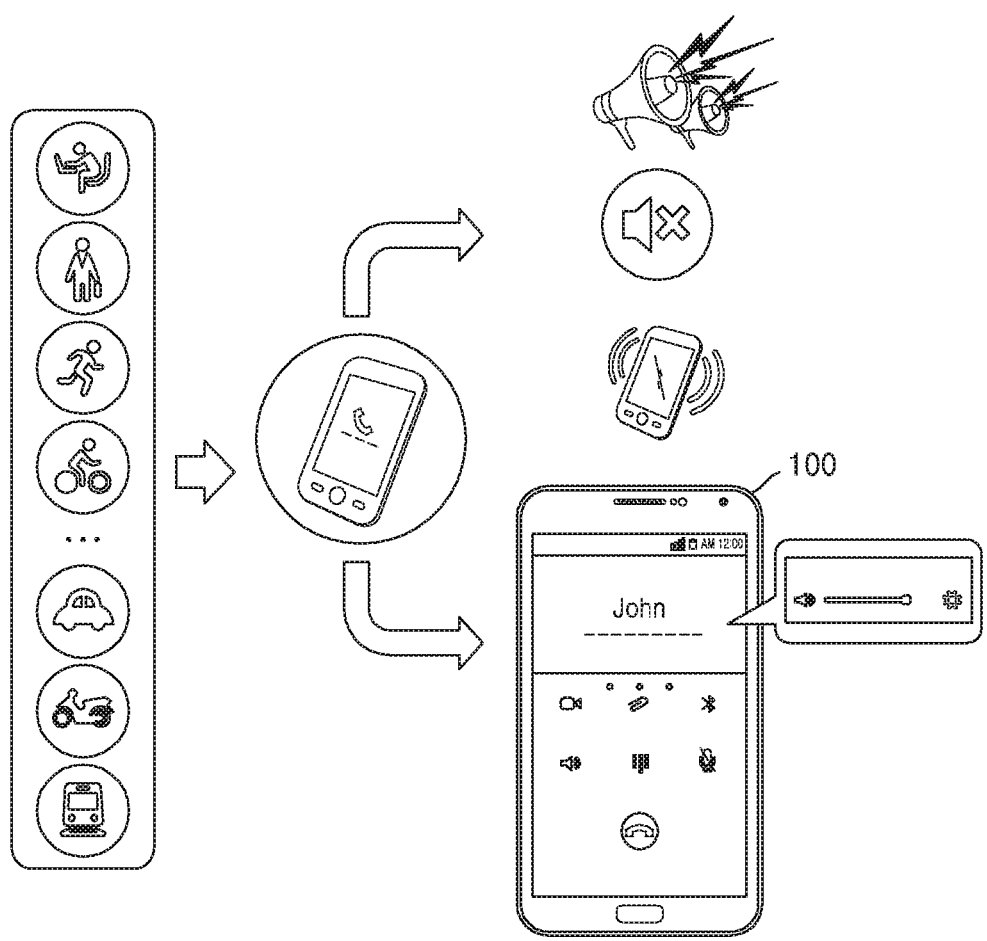
FIG. 15 illustrates a process of automatically adjusting a call ringtone or a call volume according to a motion status of a user, according to an embodiment of the present disclosure.

FIG. 15 illustrates a process of automatically adjusting a call ringtone or a call volume according to a motion status of a user, according to an embodiment of the present disclosure. The mobile terminal 100 may automatically adjust a call ringtone or a call volume of the mobile terminal 100 during receiving a call, based on the motion status of the user.

In the thirteenth implementation, an incoming call or a call are controlled according to a current motion status of the user through the following two modes.

(1) When an incoming call rings, a ringtone of the incoming call is automatically adjusted according to the current motion status of the user. When the user starts the setting of "automatically adjusting an incoming call ringtone according to a motion status of a user when an incoming call rings", the current motion status of the user is obtained. A ringtone corresponding to the obtained motion status of the user may be found from a table of predefined mapping relationships between motion statuses and incoming call ringtones, and the incoming call ringtone of the system is adjusted automatically.

(2) In a call process, the call volume is automatically adjusted according to the current motion status of the user. When the user starts the setting of "automatically adjusting a call volume according to a motion status of a user", the current motion status of the user is obtained. A call volume corresponding to the obtained motion status of the user may be found from a table of predefined mapping relationships between motion statuses and call volumes, and the call volume of the system is adjusted automatically.

In a fourteenth implementation, the setting item is an item for status reply, and a method of resetting the selected setting item according to the obtained motion status includes, if a setting of "performing a status reply through a short message according to a motion status of a user when an incoming call is not answered for a long time" is started, reading a predefined unanswered time period, starting a timing operation when the mobile terminal 100 receives a call request, and, when a timing period is larger than the unanswered time period or the call request terminates, replying a short message containing the obtained motion status to a call requester; and if a setting of "performing a status reply through a short message according to a motion status of a user when a received short message is not replied for a long time" is started, reading a predefined unanswered time period, and starting a timing operation when the mobile terminal 100 receives a short message from an opposite party, and when a timing period is larger than the unanswered time period, replying a short message containing the obtained motion status to a sender.

The fourteenth implementation will now be described in detail.

Figure 16:
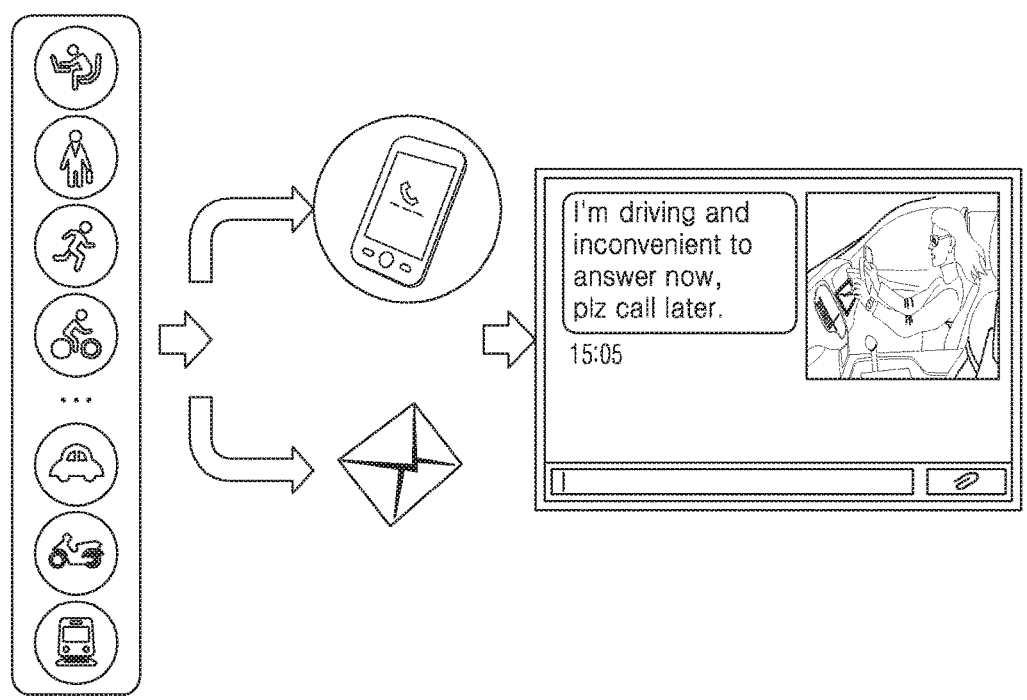
FIG. 16 illustrates a process of automatically performing status replies to an incoming call and a received short message according to a current motion status of a user, according to an embodiment of the present disclosure.

FIG. 16 illustrates a process of automatically performing status replies to an incoming call and a received short message according to a current motion status of a user, according to an embodiment of the present disclosure. When an incoming call or a received short message is not answered for a long time, the mobile terminal 100 may send a status reply including a motion status of the user to the opposite party of the incoming call or the received short message, based on the motion status of the user.

In the fourteenth implementation, the status reply may be performed automatically for the incoming call and the received short message according to the current motion status of the user through two following modes.

(1) When a user does not answer an incoming call for a long time, the status reply is performed automatically according to the current motion status of the user. When the user starts a setting of "performing a status reply through a short message according to a motion status of a user when an incoming call is not answered for a long time", the unanswered reply time period is read, and a timing operation starts when the mobile terminal 100 receives a call request. The current motion status of the user is obtained. When the timing period is larger than the unanswered reply time period or the call request terminates, the motion status information of the user is added with a predefined letter according to the motion status of the user and a number corresponding to the call request, and is sent to the call requester.

(2) When the user does not reply the received short message for a long time, the status reply is performed automatically according to the current motion status of the user. When the user starts a setting of "performing a status reply through a short message according to a motion status of a user when a received short message is not replied for a long time", the non-replied reply time period is read, and a timing operation starts when the mobile terminal 100 receives a short message from an opposite party. The current motion status of the user is obtained. When the timing period is larger than the non-replied time period, the motion status information of the user is added with a predefined letter according to the motion status of the user and a number sending the short message, and is sent to the short message sender.

Figure 17A:
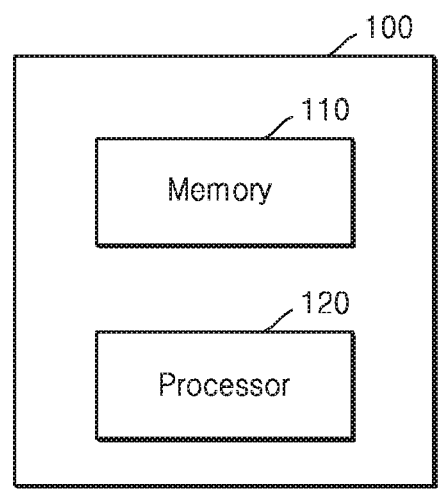
FIGS. 17A-17C are block diagrams illustrating a structure of a mobile terminal, according to an embodiment of the present disclosure.
Figure 17B:
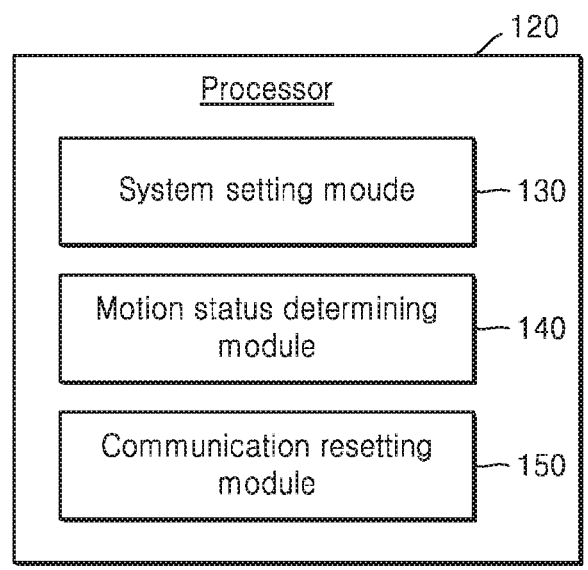
Figure 17C:
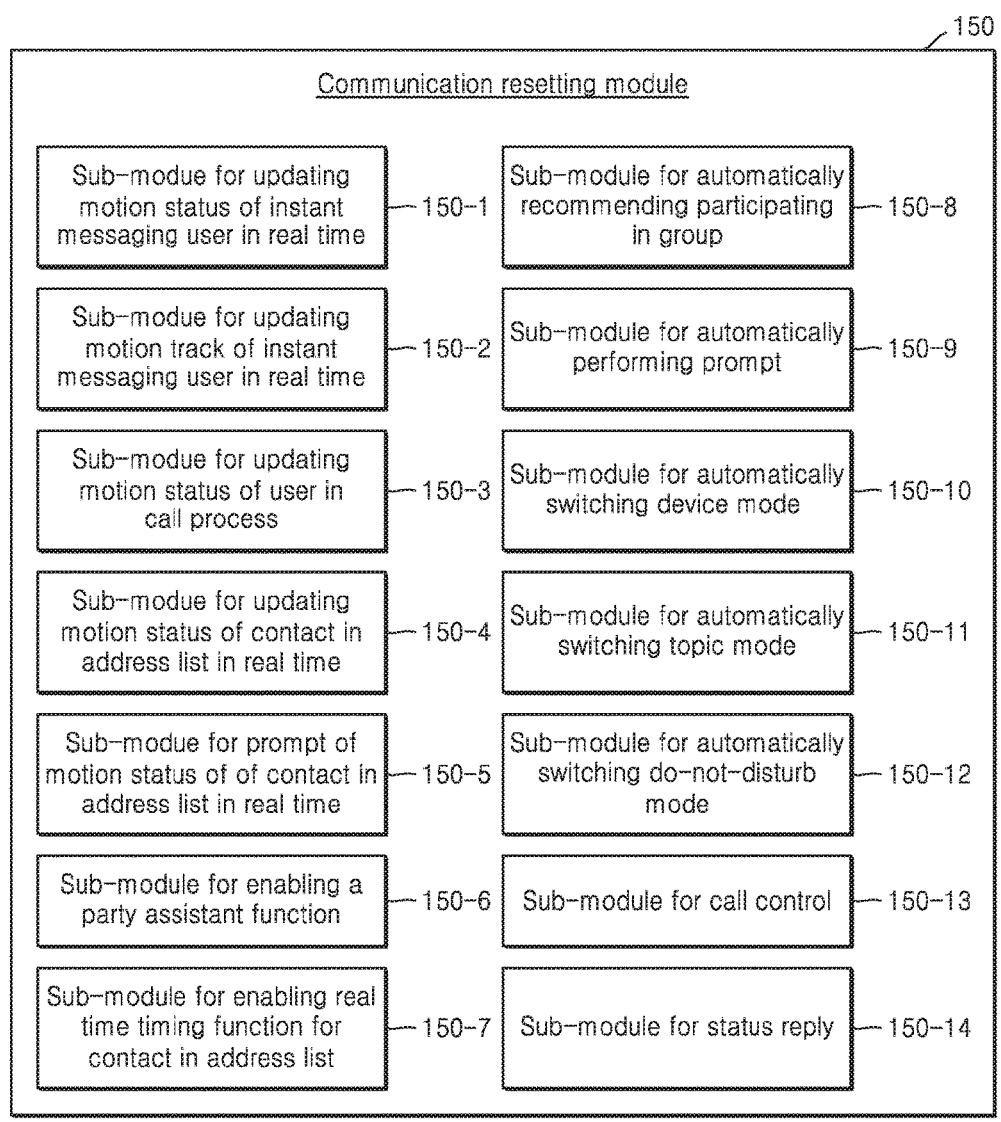

FIGS. 17A-17C are block diagrams illustrating a structure of the mobile terminal 100, according to an embodiment of the present disclosure.

Referring to FIG. 17A, the mobile terminal 100 may include a memory 110 which stores computer executable instructions, and at least one processor 120 which obtains the motion state of the user of the mobile terminal 100 and performs a function of the mobile terminal 100 corresponding to a certain event, based on the obtained motion state, by executing the computer executable instructions. The mobile terminal 100 may include a plurality of processors that perform predetermined functions, respectively, or a single integrated processor that performs a plurality of functions.

The processor 120 of the mobile terminal 100 may periodically receive output data from an inertia sensor of the mobile terminal 100, read a feature value from the received output data, and determine a motion status corresponding to the read feature value from a table of mapping relationships between motion statuses and feature values. The mobile terminal 100 may obtain starting location information and ending location information corresponding to a predetermined terminal interval by a GPS, calculate a movement velocity corresponding to the predetermined time interval, based on the starting location information and the ending location information, and determine a motion status corresponding to the calculated movement velocity from a table of mapping relationships between motion statuses and movement velocities.

The processor 120 of the mobile terminal 100 may update a motion status of an instant messaging user displayed on an instant messaging interface in response to execution of an instant message application, based on the obtained motion status. The processor 120 of the mobile terminal 100 may update a motion status of the opposite party displayed on a call interface in response to execution of a call application, based on the obtained motion status. The processor 120 of the mobile terminal 100 may update a motion status of a contact displayed on an address list in response to execution of an address list application, based on the obtained motion status. The processor 120 of the mobile terminal 100 may display, in real time, the motion status of the contact in the address list and a time period required by the contact from a current location to a destination on a UI in response to execution of a real-time timing function for the contact, based on the obtained motion status. The processor 120 of the mobile terminal 100 may automatically switch a device mode in response to execution of the mobile terminal 100, based on the obtained motion status. The processor 120 of the mobile terminal 100 may automatically adjust a call ringtone or a call volume of the mobile terminal 100 during receiving a call, based on the obtained motion status.

The mobile terminal 100 includes a system setting module 130, a motion status determining module 140, and a communication resetting module 150.

The system setting module 130 may select a setting item for resetting communication settings.

The motion status determining module 140 may detect a motion status of the mobile terminal 100 in real time, obtain a current motion status of the mobile terminal 100, and send the obtained motion status to the communication resetting module 150.

The communication resetting module 150 may reset the selected setting item according to the obtained motion status.

The setting item is an item for updating the motion status of the instant messaging user in real time, and the communication resetting module 150 includes a sub-module 150-1 for updating the motion status of the instant messaging user in instant messaging in real time. The sub-module 150-1 may send the obtained motion status of the instant messaging user to the instant messaging server, to inform the instant messaging server to update the motion status displayed on the instant messaging interface according to the obtained motion status of the instant messaging user.

The setting item is an item for updating the motion track of the instant messaging user in real time, and the communication resetting module 150 includes a sub-module 150-2 for updating the motion track of the instant messaging user in instant messaging in real time. The sub-module 150-2 may obtain the current motion status of the instant massaging user, determine the motion track of the instant messaging user within a period of time according to the current motion status and time information obtained through time sampling, and send the motion track of the instant messaging user within the period of time to the instant messaging server, to inform the instant messaging server to update the motion track displayed on the instant messaging interface according to the obtained motion track of the instant messaging user.

The setting item is an item for updating the motion status of the user in a call process in real time, and the communication resetting module 150 includes a sub-module 150-3 for updating the motion status of the user in the call process in real time. The sub-module 150-3 may send the obtained motion status of the user to a call server, to inform the call server to update the motion status displayed in the call process according to the obtained motion status of the user.

The setting item is an item for updating the motion status of the contact in the address list in real time, and the communication resetting module 150 includes a sub-module 150-4 for updating the motion status of the contact in the address list in real time. The sub-module 150-4 may send the obtained motion status of the contact to the instant messaging server, to inform the instant messaging server to update the motion status of the contact displayed in the address list according to the obtained motion status of the contact.

The setting item is an item for prompt of the motion status of the contact in the address list, and the communication resetting module 150 includes a sub-module 150-5 for prompt of the motion status of the contact in the address list. The sub-module 150-5 may obtain the motion status or motion status change of the contact. When the motion status or the motion status change of the contact matches a to-be-monitored preset motion status or motion status change of the contact, the sub-module 150-5 may prompt a user according to a predefined system prompting mode corresponding to the motion status or the motion status change of the contact.

The setting item is an item for enabling a party assistant function in instant messaging, and the communication resetting module 150 includes a sub-module 150-6 for enabling the party assistant function. The sub-module 150-6 may query and obtain a motion track of each party member in real time, and send the motion track and location information of each party member to an instant messaging server, to inform the instant messaging server to display the motion track and the location information of each party member on a group interface of instant messaging in real time.

The setting item is an item for enabling a real-time timing function for a contact in an address list, and the communication resetting module 150 includes a sub-module 150-7 for enabling the real-time timing function for the contact in the address list. The sub-module 150-7 may query and obtain a current motion status of the contact, find a destination corresponding to the contact from a table of predefined mapping relationships between contacts and destinations, obtain a real-time geographical location of the contact through a GPS, calculate a physical distance from a current location of the contact to a destination, calculate a time period required by the contact from the current location to the destination, and display the motion status of the contact and the time period required by the contact from the current location to the destination on a UI in real time.

The setting item is an item for automatically recommending participating in a group according to a motion status of a user, and the communication resetting module 150 includes a sub-module 150-8 for automatically recommending participating in the group. The sub-module 150-8 may obtain a current motion status of the user, find a recommended group corresponding to the motion status of the user from a table of predefined mapping relationships between motion statuses and recommended groups, and recommend the user to participate in the recommended group.

The setting item is an item for automatically performing prompt according to a motion status of a user, and the communication resetting module 150 includes a sub-module 150-9 for automatically performing prompt. The sub-module 150-9 may obtain a current motion status of the user, find an automatic prompting function corresponding to the current motion status of the user from a table of predefined mapping relationships between motion statuses and automatic prompting functions, and push prompting information corresponding to the automatic prompting function to the user.

The setting item is an item for automatically switching a device mode according to a motion status of a user, and the communication resetting module 150 includes a sub-module 150-10 for automatically switching the device mode. The sub-module 150-10 may obtain a current motion status of the user, find a device mode corresponding to the current motion status of the user from a table of predefined mapping relationships between motion statuses and device modes, and switch a device mode of a system to the obtained device mode.

The setting item is an item for automatically switching a topic mode according to a motion status of a user, and the communication resetting module 150 includes a sub-module 150-11 for automatically switching the topic mode. The sub-module 150-11 may obtain a current motion status of the user, find a topic mode corresponding to the current motion status of the user from a table of predefined mapping relationships between motion statuses and topic modes, and switch a topic mode of a system to the obtained topic mode.

The setting item is an item for automatically switching a do-not-disturb mode according to a motion status of a user, and the communication resetting module 150 includes a sub-module 150-12 for automatically switching the do-not-disturb mode. The sub-module 150-12 may obtain a current motion status of the user, find a do-not-disturb mode corresponding to the current motion status of the user from a table of predefined mapping relationships between motion statuses and do-not-disturb modes, and switch a do-not-disturb mode of a system to the obtained do-not-disturb mode.

The setting item is an item for call control, and the communication resetting module 150 includes a sub-module 150-13 for call control. If a setting of "automatically adjusting an incoming call ringtone according to a motion status of a user" is started, the sub-module 150-13 for call control may find a ringtone type from a table of predefined mapping relationship between motion statuses and incoming call ringtones according to the obtained motion status of the user, and adjust an incoming call ringtone of the system into the found ringtone type. If a setting of "automatically adjusting a call volume according to a motion status of a user in a call process" is started, the sub-module 150-13 for call control may find a call volume from a table of predefined mapping relationship between motion statuses and call volumes according to the obtained motion status of the user, and adjust a call volume of the system into the found call volume.

The setting item is an item for status reply, and the communication resetting module 150 includes a sub-module 150-14 for status reply. If a setting of "performing a status reply through a short message according to a motion status of a user when an incoming call is not answered for a long time" is started, the sub-module 150-14 for status reply may read a predefined unanswered time period, and start a timing operation when the mobile terminal 100 receives a call request. When a timing period is larger than the unanswered time period or the call request terminates, the sub-module 150-14 for status reply may reply a short message containing the obtained motion status to a call requester.

If a setting of "performing a status reply through a short message according to a motion status of a user when a received short message is not replied for a long time" is started, the sub-module 150-14 for status reply may read a predefined non-replied time period, and start a timing operation when the mobile terminal 100 receives a short message from the opposite party. When a timing period is larger than the non-replied time period, the sub-module 150-14 for status reply may reply a short message containing the obtained motion status to a sender.

The system setting module 130 of the mobile terminal 100 may set an application scenario related to a motion status of a user, and may include the following setting:

(1) whether motion status detection is started, and whether GPS assistant detection is started;

(2) whether the motion status of the user is displayed in real time on an instant messaging interface;

(3) whether the motion status of the user is displayed in real time in a call process;

(4) whether an incoming call ringtone is adjusted automatically according to the motion status of the user; if yes, the user may set a ringtone type corresponding to the motion status, that is, set a table of mapping relationships between motion statuses and incoming call ringtones;

(5) whether a call volume is adjusted automatically according to the motion status of the user; if yes, the user may set a call volume corresponding to the motion status, that is, set a table of mapping relationships between motion statuses and call volumes;

(6) whether a status reply is performed through a short message according to the motion status of the user when an incoming call is not answered for a long time; if yes, an unanswered reply time period is set, that is, a time period during which a call request is not answered, for example, 1 minute, is set, and the status reply is performed after the time period, or the incoming call is automatically replied after the call request terminates; and (7) whether a status reply is performed through a short message according to the motion status of the user when a short message is not replied for a long time; if yes, a non-replied time period is set, that is, a time period during which a short message received from the opposite party is not replied in instant messaging, for example, 1 minute, is set, and the status reply is performed automatically after the time period.

Hereinafter, an example of performing communication setting according to the solution of the present disclosure is described.

1. A user performs the following settings:

(1) starting motion status detection;

(2) starting to display the motion status of the user in real time on an instant messaging interface;

(3) starting to display the motion status of the user in real time in a call process;

(4) starting to automatically adjust an incoming call ringtone according to the motion status of the user;

(5) starting to automatically adjust a call volume according to the motion status of the user in a call process;

(6) starting to perform a status reply through a short message according to the motion status of the user when an incoming call is not answered for a long time, and setting an unanswered reply time period, or taking a time point after a call request terminates in default as a time point at which the status reply is performed; and (7) starting to perform a status reply through a short message according to the motion status of the user when a short message is not replied for a long time, and setting a non-replied time period, for example, 1 minute.

2. The motion status of the user in an interface of the instant messaging is updated in real time.

3. The motion status of the user in an interface of a call process is updated in real time.

4. If the user is walking when an incoming call rings, the incoming call ringtone is adjusted automatically into a ringtone type corresponding to the walking status.

5. If the user is walking when an incoming call rings, the incoming call volume is adjusted automatically into a call volume corresponding to the walking status.

6. If the user does not answer an incoming call, the mobile terminal 100 automatically replies a shot message containing the motion status of the user when the incoming call terminates.

7. When chatting with a friend in instant messaging, if a short message received from the friend has not been replied after one minute, the mobile terminal 100 automatically replies a shot message containing the motion status of the user.

Through combining the motion status of the user, the current motion status of the user may be determined accurately, intelligent human-machine interaction may be implemented, and optimal service experiences may be provided.

Figure 18:
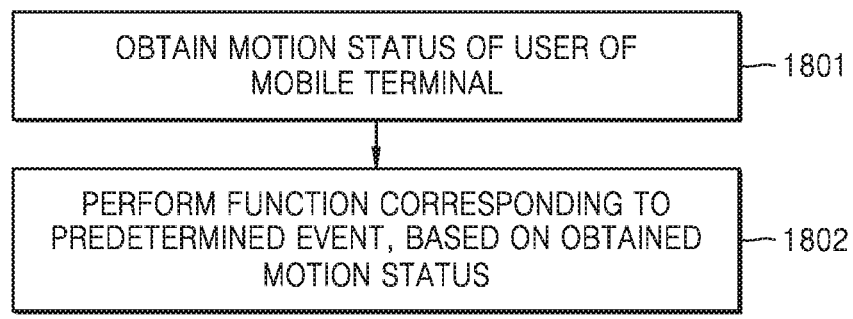
FIG. 18 is a flowchart illustrating a method of controlling a mobile terminal, according to an embodiment of the present disclosure.

FIG. 18 is a flowchart illustrating a method of controlling the mobile terminal 100, according to an embodiment of the present disclosure.

In operation 1801, the mobile terminal 100 obtains a motion status of a user of the mobile terminal 100.

The mobile terminal 100 may periodically receive output data from an inertia sensor of the mobile terminal 100, read a feature value from the received output data, and determine a motion status corresponding to the read feature value from a table of mapping relationships between motion statuses and feature values. The mobile terminal 100 may obtain starting location information and ending location information corresponding to a predetermined terminal interval by a GPS, calculate a movement velocity corresponding to the predetermined time interval, based on the starting location information and the ending location information, and determine a motion status corresponding to the calculated movement velocity from a table of mapping relationships between motion statuses and movement velocities.

In operation 1802, the mobile terminal 100 performs a function corresponding to a predetermined event, based on the obtained motion status.

The mobile terminal 100 may update the motion status of the instant messaging user displayed on the instant messaging interface in response to execution of an instant message application, based on the obtained motion status.

The mobile terminal 100 may update the motion status of the opposite party displayed on the call interface in response to execution of a call application, based on the obtained motion status.

The mobile terminal 100 may update motion statuses of contacts displayed in the address list in response to execution of an address list application, based on the obtained motion status.

The mobile terminal 100 may display, in real time, a motion status of the contact in the address list and a time period required by the contact from a current location to a destination on a UI in response to execution of a real-time timing function for the contact, based on the obtained motion status.

The mobile terminal 100 may automatically switch a device mode in response to execution of the mobile terminal 100, based on the obtained motion status.

The mobile terminal 100 may automatically adjust a call ringtone or a call volume of the mobile terminal 100 during receiving a call, based on the obtained motion status.

While the present invention has been particularly shown and described with reference to exemplary embodiments thereof, it will be understood that various changes in form and details may be made therein without departing from the spirit and scope of the following claims.

The invention claimed is:

1. A method of controlling a mobile terminal, the method comprising:
obtaining information representing a motion status of a user of the mobile terminal; and
performing a function of the mobile terminal corresponding to a predetermined event, based on the obtained information representing the motion status,
wherein the performing of the function of the mobile terminal comprises transmitting the information representing the motion status of the user to a counterpart device which is in communication with the mobile terminal, and
wherein a GUI object representing the motion status of the user is displayed, based on the transmitted information representing the motion status, in an interface of a contact application which is executed in the counterpart device.

2. The method of claim 1, wherein the obtaining of the information representing the motion status comprises:
periodically receiving output data from an inertia sensor of the mobile terminal;
reading a feature value from the received output data; and
determining the motion status corresponding to the read feature value from a table of mapping relationships between motion statuses and feature values.

3. The method of claim 1, wherein the obtaining of the information representing the motion status comprises:
obtaining, by a global positioning system (GPS), starting location information and ending location information corresponding to a predetermined time interval;
calculating a movement velocity corresponding to the predetermined time interval, based on the starting location information and the ending location information; and
determining the motion status corresponding to the calculated movement velocity from a table of mapping relationships between motion statuses and movement velocities.

4. The method of claim 1, wherein the contact application is an instant message application,
wherein the performing of the function of the mobile terminal further comprises transmitting the information representing the motion status of the user to the counterpart device in response to execution of the instant message application, and
wherein a GUI object representing the motion status of the user displayed on an instant messaging interface of the instant messaging application of the counterpart device is updated, based on the transmitted information representing the motion status.

5. The method of claim 1, wherein the contact application is a call application,
wherein the performing of the function of the mobile terminal further comprises transmitting the information representing the motion status of the user to the counterpart device in response to execution of the call application, and
wherein a GUI object representing the motion status of the user displayed on a call interface of the call application of the counterpart device, based on the transmitted information representing the motion status.

6. The method of claim 1, wherein the contact application is an address list application,
wherein the performing of the function of the mobile terminal further comprises transmitting the information representing the motion status of the user to the counterpart device in response to execution of the address list application, and
wherein a GUI object representing the motion status of the user displayed on an address list of the address list application of the counterpart device, based on the transmitted information representing the motion status.

7. The method of claim 1, wherein the contact application is an address list, and
wherein the performing of the function of the mobile terminal further comprises displaying, in real time, a motion status of a contact in the address list and a time period required by the contact from a current location to a destination on a user interface in response to execution of a real-time timing function for the contact, based on the obtained information representing the motion status.

8. The method of claim 1, the method further comprising:
receiving information representing a motion status of another user of the counterpart device which is in communication with the mobile terminal, and
wherein the performing of the function of the mobile terminal further comprises displaying a GUI object representing the motion status of the another user, based on the received information representing the motion status of the another user, in an interface of a contact application which is executed in the mobile terminal.

9. A method of controlling a mobile terminal, the method comprising:
obtaining information representing a motion status of a user of the mobile terminal; and
performing a function of the mobile terminal corresponding to a predetermined event, based on the obtained information representing the motion status,
wherein the performing of the function of the mobile terminal comprises automatically switching a home screen layout of the mobile terminal in response to execution of the mobile terminal, based on the obtained information representing the motion status.

10. A method of controlling a mobile terminal, the method comprising:
obtaining information representing a motion status of a user of the mobile terminal; and
performing a function of the mobile terminal corresponding to a predetermined event, based on the obtained information representing the motion status,
wherein the performing of the function of the mobile terminal comprises automatically adjusting a ringtone or a call volume of the mobile terminal when receiving a call, based on the obtained information representing the motion status.

11. A method of controlling a mobile terminal, the method comprising:
obtaining information representing a motion status of a user of the mobile terminal; and
performing a function of the mobile terminal corresponding to a predetermined event, based on the obtained information representing the motion status,
wherein the performing of the function of the mobile terminal comprises, when an incoming call or a received short message is not answered within a predetermined unanswered time period, sending a status reply including the obtained motion status to an opposite party of the incoming call or the received short message, based on the obtained information representing the motion status.

12. A mobile terminal comprising:
a communication interface;
at least one sensor configured to detect a motion of the mobile terminal;
a memory storing one or more instructions; and
at least one processor configured to execute the one or more instructions at least to:
obtain information representing a motion status of a user of the mobile terminal; and
perform a function of the mobile terminal corresponding to a predetermined event, based on the obtained information representing the motion status,
wherein the at least one processor executes the one or more instructions to transmit the information representing the motion status of the user to a counterpart device which is in communication with the mobile terminal, and
wherein a GUI object representing the motion status of the user is displayed, based on the transmitted information representing the motion status, in an interface of a contact application which is executed in the counterpart device.

13. A computer program product comprising a non-transitory computer readable storage medium comprising a computer readable program stored therein, wherein the computer readable program, when executed on a computing device, causes the computing device to perform operations of:
obtaining information representing a motion status of a user of the computing device; and
performing a function of the computing device corresponding to a predetermined event, based on the obtained information representing the motion status,
wherein the performing of the function of the computing device comprises transmitting the information representing the motion status of the user to a counterpart device which is in communication with the computing device, and
wherein a GUI object representing the motion status of the user is displayed, based on the transmitted information representing the motion status, in an interface of a contact application which is executed in the counterpart device.

* * * * *